United States Patent
Palojärvi et al.

(10) Patent No.: US 10,375,023 B2
(45) Date of Patent: Aug. 6, 2019

(54) SYSTEM, METHOD AND COMPUTER PROGRAM PRODUCT FOR ACCESSING AT LEAST ONE VIRTUAL PRIVATE NETWORK

(75) Inventors: Jari Palojärvi, Tampere (FI); Juha P. Savolainen, Espoo (FI); Mika T. Kettunen, Kirkkonummi (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1581 days.

(21) Appl. No.: 10/881,921

(22) Filed: Jun. 30, 2004

(65) Prior Publication Data

US 2005/0198306 A1  Sep. 8, 2005

Related U.S. Application Data

(60) Provisional application No. 60/546,448, filed on Feb. 20, 2004.

(51) Int. Cl.
- G06F 15/16 (2006.01)
- H04L 29/06 (2006.01)
- H04L 12/46 (2006.01)

(52) U.S. Cl.
CPC ...... H04L 63/0272 (2013.01); *H04L 12/4641* (2013.01)

(58) Field of Classification Search
CPC .................. H04L 12/4641; H04L 63/0272
USPC ................ 709/220–223, 225, 227, 229, 248; 726/1–4, 12, 15; 370/397, 335, 328, 409
See application file for complete search history.

(56) References Cited

U.S. PATENT DOCUMENTS

| | | | |
|---|---|---|---|
| 6,330,562 B1* | 12/2001 | Boden et al. | 707/10 |
| 6,529,513 B1 | 3/2003 | Howard et al. | |
| 6,539,483 B1* | 3/2003 | Harrison | H04L 12/4641 707/999.01 |
| 6,636,898 B1* | 10/2003 | Ludovici et al. | 709/250 |

(Continued)

FOREIGN PATENT DOCUMENTS

| | | |
|---|---|---|
| EP | 1 045 553 A21 | 10/2000 |
| EP | 1 309 126 A1 | 5/2003 |

(Continued)

OTHER PUBLICATIONS

S. Kent; *Security Architecture for the Internet Protocol*; Nov. 1998; 66 pages; The Internet Society.

(Continued)

*Primary Examiner* — Douglas B Blair
(74) *Attorney, Agent, or Firm* — Alston & Bird LLP

(57) ABSTRACT

A system for accessing at least one Virtual Private Network (VPN) includes a terminal, and can include at least one Security Policy Database (SPD). The terminal is capable of communicating with a VPN client and at least one application. The VPN client, in turn, is capable of defining at least one VPN access point, each VPN access point including an associated physical access point and VPN policy. Thereafter, the VPN client can access at least one VPN based upon the VPN access point(s) to thereby establish at least one data connection from at least one application across the at least one VPN. In addition, the VPN client can be capable of downloading at least one VPN policy from the SPD. A system for managing at least one Virtual Private Network (VPN) policy is also provided, where the VPN polic(ies) are for use in accessing at least one VPN.

21 Claims, 15 Drawing Sheets

(56) References Cited

U.S. PATENT DOCUMENTS

| | | | |
|---|---|---|---|
| 6,912,232 B1* | 6/2005 | Duffield | H04L 12/4641 370/231 |
| 6,941,465 B1* | 9/2005 | Palekar et al. | 726/1 |
| 7,036,143 B1* | 4/2006 | Leung et al. | 726/15 |
| 7,209,479 B2* | 4/2007 | Larson | 370/389 |
| 7,242,665 B2 | 7/2007 | Langille et al. | |
| 7,333,799 B2* | 2/2008 | Natarajan | H04L 12/4633 455/411 |
| 7,363,022 B2* | 4/2008 | Whelan | H04L 29/06 455/186.1 |
| 7,366,187 B2* | 4/2008 | McCabe | 370/401 |
| 7,444,508 B2* | 10/2008 | Karjala et al. | 713/156 |
| 2002/0022483 A1 | 2/2002 | Thompson et al. | |
| 2002/0069278 A1* | 6/2002 | Forslow Jan | 709/225 |
| 2002/0083344 A1 | 6/2002 | Vairavan | |
| 2002/0093915 A1* | 7/2002 | Larson | 370/235 |
| 2002/0126667 A1* | 9/2002 | Oguchi | H04L 12/4641 370/389 |
| 2002/0131407 A1 | 9/2002 | Muhonen | |
| 2002/0131576 A1 | 9/2002 | Lampola | |
| 2002/0146109 A1 | 10/2002 | Sahala | |
| 2002/0161905 A1* | 10/2002 | Haverinen | H04L 29/06 709/229 |
| 2002/0178240 A1* | 11/2002 | Fiveash et al. | 709/221 |
| 2003/0016681 A1 | 1/2003 | Lampola | |
| 2003/0041136 A1* | 2/2003 | Cheline et al. | 709/223 |
| 2003/0120821 A1 | 6/2003 | Thermond et al. | |
| 2003/0177389 A1* | 9/2003 | Albert | H04L 12/2856 726/1 |
| 2003/0204596 A1* | 10/2003 | Yadav | 709/226 |
| 2003/0225854 A1 | 12/2003 | Zhang et al. | |
| 2004/0022258 A1* | 2/2004 | Tsukada et al. | 370/401 |
| 2004/0054722 A1* | 3/2004 | DeFloor | G06F 17/30896 709/203 |
| 2004/0083298 A1* | 4/2004 | El Mghazli et al. | 709/230 |
| 2004/0117653 A1 | 6/2004 | Shapira et al. | |
| 2004/0168051 A1 | 8/2004 | Guo et al. | |
| 2004/0225895 A1* | 11/2004 | Mukherjee | H04L 12/4633 726/15 |
| 2004/0268142 A1* | 12/2004 | Karjala | H04L 63/0272 726/15 |
| 2004/0268148 A1* | 12/2004 | Karjala | H04L 41/0806 726/15 |
| 2005/0101305 A1* | 5/2005 | Natarajan | H04L 12/4633 455/414.1 |
| 2005/0193103 A1* | 9/2005 | Drabik | H04L 63/0272 709/221 |
| 2005/0262356 A1* | 11/2005 | Sandiford | H04L 63/10 713/182 |

FOREIGN PATENT DOCUMENTS

| | | |
|---|---|---|
| WO | WO 03/027878 A1 | 4/2003 |
| WO | WO 03/045034 A1 | 5/2003 |
| WO | WO 03/098461 A1 | 11/2003 |
| WO | WO 2004/015930 A2 | 2/2004 |
| WO | WO 2005/045642 A2 | 5/2005 |
| WO | WO 2005/072276 A2 | 8/2005 |

OTHER PUBLICATIONS

Izumi Miki, Significant Functional Enhancement of Check Point Seeking a VPN Resistant in Real Operation o, Interop Magazine, Japan, Softbank Publishing Co., Ltd., Aug. 1, 1999, vol. 9, No. 5, p. 183.

Verification of VPN Practice Installation Course No. 4, Introduction of the PPTP Client, [online], Japan, @IT, Jun. 5, 2003, [Retrieval date: May 1, 2009], specifically, 3. Set up of the Connection to the VPN Server, Internet <URL: http://www.atmarkit.co.jp/fwin2k/verification/VPN04/VPN04_03.html>.

Remote Connection Environment Design and Construction Manual, N+1 Network Guide July, Japan, Softbank Publishing Co., Ltd., Jul. 1, 2002, vol. 2, No. 7 to No. 15, p. 90 to p. 98.

Japanese Unexamined Patent Publication (Kokai) No. 2003-018156.

Notice of Reasons for Rejection dated Jan. 19, 2010 in connection with corresponding Japanese Patent Application No. 2006-553704.

Office Action for European Application No. 05 708 565.6 dated Oct. 8, 2010.

Office Action (Decision of Final Rejection) for Japanese Patent Application No. 2006-553704 dated Oct. 20, 2010

Office Action (Decision to Decline Amendment) for Japanese Patent Application No. 2006-553704 dated Oct. 20, 2010

Eiji Nishimura; Microsoft Windows Security Technology Details; N+Inetwork Guide; vol. 2, No. 6; Japan, Softbank Publishing Inc.; Jun. 1, 2002; , pp. 100-107.

Yoshihide Ishikawa; Server Administrator Training Course; Windows Server World; vol. 9, No. 2; Japan; IDG Japan; Feb. 1, 2004; pp. 182-186.

Intellectual Property Office India, First Examination Report for Application No. 4801/DELNP/2006, dated Apr. 3, 2013, 2 pages, India.

International Search Report and Written Opinion for Application No. PCT/IB2005/000438 dated May 25, 2005.

Decision to Grant for European Application No. 05708565.6 dated Dec. 30, 2011.

Office Action for Korean Application No. 10-2006-7019333 dated Jul. 19, 2007.

Notice of Allowance for Korean Application No. 10-2006-7019333 dated Jan. 30, 2008.

Windows Server World (Feb. 2004) pp, 182-186.

Microsoft Windows, Network Guide (2007) pp. 100-107; 151.

Denker, J. S. et al., *Moat: a Virtual Private Network Appliance and Services Platform*, 1999 LISA XIII (Nov. 1999) pp. 251-260.

Kent, S. et al., *Security Architecture for the Internet Protocol*, RFC 2401 (Nov. 1998) 62 pages.

Kourai, K. et al., *Secure and Manageable Virtual Private Networks for End-Users*, Local Computer Networks, LCN'03; Proceedings 28th Annual IEEE International Conference on IEEE (2003) 10 pages.

Maughan, D. et al., *Internet Security Assocation and Key Management Protocl (ISAKMP)* RFC 2408(Nov. 1998) 81 pages.

VPN Practical Installation Course No. 4, Installation [Introduction] of the PPTP Client (Jun. 5, 2003) pp. 1-5.

\* cited by examiner

SYSTEM, METHOD AND COMPUTER PROGRAM PRODUCT FOR ACCESSING AT LEAST ONE VIRTUAL PRIVATE NETWORK

CROSS-REFERENCE TO RELATED APPLICATIONS

The present application claims priority from U.S. Patent Application Ser. No. 60/546,448, entitled: SYSTEM, TERMINAL AND METHOD FOR ACCESSING AT LEAST ONE VIRTUAL PRIVATE NETWORK (VPN), filed on Feb. 20, 2004, the contents of which are incorporated herein by reference in its entirety.

FIELD OF THE INVENTION

The present invention generally relates to systems and methods of accessing a Virtual Private Network (VPN) and, more particularly, relates to systems and methods of accessing at least one VPN via at least one established VPN access point.

BACKGROUND OF THE INVENTION

The benefit of using the Internet to obtain access to the wealth of information available online and that portion of the Internet comprising the World Wide Web (WWW) is widely recognized. Traditional ways of accessing the Internet have in the past been performed through stationary access points such as at work, school, or at home. The concept of stationary access points has been at the root of the Internet model from the beginning. By way of example, Internet Protocol (IP) routes packets to their destinations according to their IP addresses. The IP addresses are associated with a fixed physical location much the same way as conventional phone numbers are associated with the physical locations of fixed line phones. This association with the physical location allows IP packets to be routed to their intended destination in an efficient and effective way.

The traditional concept of connectivity has undergone changes caused by the trend toward mobility as witnessed, for example, by the transition to mobile telephony in recent years. Mobile computing is another area that is gaining popularity where benefits can be clearly achieved by allowing users the freedom of carrying out their work irrespective of their location. Furthermore, reliable access to the Internet, and services available in the Internet, will enable mobile networking to provide improved productivity for all users by freeing them from the ties that bind us to the office. More and more the trend is moving toward wireless connections that provide even more freedom by allowing access from virtually any location such as on airplanes and in automobiles, for example.

One of the primary concerns with IP content, computing and communication is that of security. The open nature of the Internet inherently exposes transmitted packets to security issues which are compounded by the movement of mobile nodes between different sub-networks. To deal with these issues, an IP security protocol (or simply IPsec) has been developed, such as that specified in Internet Engineering Task Force (IETF) request for comment document RFC 2401, entitled: *Security Architecture for the Internet Protocol*, the contents of which are hereby incorporated by reference in its entirety. In this regard, IPsec was developed to provide end-to-end security for the payload of packets when transmitting between IP hosts. This is chiefly accomplished by providing the hosts with datagram-level authentication and encryption of packets, typically by using symmetric cryptography that requires the use of the same keys at both ends. A key management protocol such as Internet Key Exchange (IKE) can be used to generate the symmetric keys for use in an IPsec stack such as that employed in a Virtual Private Network (VPN).

As will be appreciated by those skilled in the art, a VPN is a logical network located within one or more physical networks. A VPN can be used to securely access resources, such as email or Intranet resources, of an enterprise. Additionally or alternatively, a VPN can be used to securely communicate across local area networks, one or more of which may be included within an Intranet of an enterprise. In operation, an IPsec VPN-enabled host, or VPN gateway, maintains security policies in a Security Policy Database (SPD) populated with a number of selectors, as specified in RFC 2401, for example. The SPD identifies which kind of security is applied for traffic across the VPN gateway. For example, a security policy may require that all traffic packets are tunneled with an Encapsulating Security Payload (ESP) to a VPN gateway, with the exception of certain packets which are passed through without IP processing. The example of the aforementioned security policy, then, can be performed and effected on all packets passing through the VPN gateway.

Conventionally, clients have only been permitted to establish a communication over a single VPN at any given time. More particularly, conventional clients have only been permitted to activate a single VPN policy for a respective VPN at any given time. In this regard, at any point in time, such "single-homed" clients have only permitted a single active data connection and respective network interface. To improve upon such "single-homed" clients, however, "multi-homed" clients have been developed that permit simultaneous connections at any given time, including simultaneous connections over multiple VPNs. For example, mobile handheld terminals functioning in accordance with operating systems such as those developed by Symbian Limited of the United Kingdom are capable of permitting multiple simultaneously active data connections and respective network interfaces. In such instances, each network interface typically has its own IP address, routing information and associated Domain Name System (DNS) server addresses. In addition, each interface and respective data connection of a "multi-homed" client typically belong to a particular logical network defined locally in the client and identified by a network ID.

Communication over a VPN typically requires a client to establish a VPN connection by establishing communication with an access point to the physical network(s) including the respective VPN, and thereafter loading or activating the VPN policy for the respective VPN. Likewise, a client typically must terminate a VPN connection by unloading or deactivating the VPN policy for the respective VPN, and thereafter terminating communication with the access point. Whereas such a procedure for initiating and terminating such VPN connections is adequate for facilitating communication over a VPN, such a procedure can place an undesirable burden on the client, or more particularly the client user. And as will be appreciated, such a burden can typically increase as the number of simultaneous VPN and other connections of clients increase in "multi-homed" clients.

SUMMARY OF THE INVENTION

In light of the foregoing background, the present invention provides an improved system, method and computer program product for accessing at least one Virtual Private Network (VPN). As explained below, in accordance with embodiments of the present invention, a terminal is capable of establishing and actively maintaining one or more VPNs such as in a "single-homed" and/or "multi-homed" configuration. In contrast to conventional "multi-homed" clients, however, the terminal is further capable of establishing each VPN connection without requiring the terminal, or terminal user, to separately establish communication with an IAP (Internet access point) to the respective physical network(s), loading or activating the VPN policy for the respective VPN, and subsequently thereafter unloading or deactivating the VPN policy for the respective VPN, and terminating communication with the IAP. In this regard, the terminal, or more particularly the terminal user, is capable of defining one or more "VPN access points." As explained below, a VPN access point can generally be considered a virtual or logical access point to a respective VPN. Utilizing VPN access points, then, the terminal can establish and actively maintain one or more VPN connections much in the same manner as IAPs, with the VPN connections having the attributes of similar VPN connections established in accordance with conventional techniques.

According to one aspect of the present invention, a system is provided for accessing at least one Virtual Private Network (VPN). The system includes a terminal, and can include at least one Security Policy Database (SPD), each SPD being associated with a physical access point. The terminal is capable of communicating with a VPN client and at least one application. The VPN client, in turn, is capable of defining at least one VPN access point, each VPN access point including an associated physical access point and VPN policy. For example, the VPN client can be capable of defining each VPN by receiving a selection of a name of the VPN access point. Then, the VPN client can receive a selection of a physical access point to associate with the VPN access point, and thereafter receive a selection of a VPN policy to associate with the VPN access point. In this regard, the VPN client can be further capable of installing at least one VPN policy such that the VPN client is capable of receiving the selection of a VPN policy from the installed VPN polic(ies).

More particularly, when the system includes at least one SPD, the VPN client can be capable of receiving a selection of a SPD. Then, the VPN client can download at least one VPN policy from the SPD via the physical access point associated with the respective SPD. The VPN client can thereafter install the downloaded VPN polic(ies). In this regard, the VPN client can be capable of establishing a data connection with the physical access point associated with the SPD, and thereafter establishing a data connection with the SPD via the data connection established with the physical access point. The VPN client can then authenticate the SPD and/or the VPN client, and download at least one VPN policy from the SPD when the SPD and/or the VPN client is authenticated.

Irrespective of how the VPN access point(s) are defined, the VPN client can thereafter accessing at least one VPN based upon the VPN(s) access point to thereby establish at least one data connection from at least one application across the VPN(s). In this regard, the VPN client can be capable of activating at least one VPN access point based upon the associated physical access point and VPN policy to thereby access the VPN(s). For example, the VPN client can be capable of associating at least one VPN access point with the application(s), and thereafter activating at least one VPN access point from the application(s) to thereby establish the at least one data connection from the at least one application across the VPN.

More particularly, the VPN client can be capable of activating each VPN access point by establishing a connection with the physical access point associated with the respective VPN access point. The VPN client can then load the VPN policy associated with the respective VPN access point. Thereafter, the VPN client can establish a VPN tunnel over the physical access point based upon the VPN policy associated with the respective VPN access point. Likewise, the VPN client can be further capable of terminating access to the VPN(s) to thereby terminate the data connection(s) from the application(s). In such instances, the terminal can terminate each access to each VPN by closing the VPN tunnel over the physical access point established based upon the VPN policy associated with the respective VPN access point. Then, the VPN client can unload the VPN policy associated with the respective VPN access point, and thereafter terminate the connection with the physical access point associated with the respective VPN access point.

According to another aspect of the present invention, a system for managing at least one Virtual Private Network (VPN) policy is provided, the VPN polic(ies) being for use in accessing at least one VPN. The system includes at least one SPD, and a terminal capable of communicating with a VPN client. The VPN client is capable of communicating with the SPD(s) across at least one physical access point to thereby download, from the SPD(s), the VPN polic(ies). The VPN client can store the VPN polic(ies) in a VPN policy store. Thereafter, the VPN client can synchronize with the SPD(s) to thereby update the VPN polic(ies) stored in the VPN policy store. One or more of the VPN polic(ies) can include a certificate and/or a certificate/private key pair. In such instances, the VPN client can be further capable of storing the certificate and/or a certificate/private key pair in a password-protected key store.

Similar to above, the VPN client can be capable of receiving a selection of a SPD, and downloading at least one VPN policy from the selected SPD via the physical access point associated with the SPD. In such instances, the VPN client can be further capable of authenticating the SPD and/or the VPN client, and downloading the VPN polic(ies) from the SPD when the SPD and/or the VPN client is authenticated. In this regard, the VPN client can be capable of authenticating the SPD based upon an SPD certificate, and authenticating the VPN client based upon a user certificate. Before authenticating the SPD based upon the SPD certificate, however, the VPN client can be capable of generating the SPD certificate. Similarly, the VPN client can be capable of generating the user certificate, such as by authenticating the VPN client to the SPD, and generating the user certificate when the VPN client is authenticated.

More particularly, for example, the SPD can have an associated identity code including a plurality of characters. The VPN client can then generate a SPD certificate by receiving confirmation of the identity code associated with the SPD, and thereafter generating the SPD certificate when confirmation is received. In this regard, the VPN client can be capable of presenting an SPD identity code dialog including the identity code associated with the SPD, the identity code in the SPD identity code dialog being presented without at least one character. The VPN client can receive the character(s). Then, the VPN client can receive confirmation of the identity code if the identity code presented in the SPD identity code dialog, with the at least one received character, matches the identity code associated with the SPD.

According to other aspects of the present invention, a method and a computer program product are provided for accessing at least one VPN. A method and a computer program product for managing at least one VPN policy are also provided. And in yet another aspect of the present invention, a VPN access point data structure is provided. Embodiments of the present invention therefore provide a system, method and computer program product for accessing at least one VPN, and for managing VPN polic(ies). By defining one or more VPN access points, embodiments of the present invention are capable of establishing each of one or more VPN connections in a manner less burdensome to the terminal or terminal user. In this regard, as indicated above and explained below, a VPN access point can generally be considered a virtual or logical access point to a respective VPN such that terminal can establish and actively maintain one or more VPN connections much in the same manner as IAPs. Therefore, the system, method and computer program product of embodiments of the present invention solve the problems identified by prior techniques and provide additional benefits.

BRIEF DESCRIPTION OF THE DRAWINGS

Figure 1:
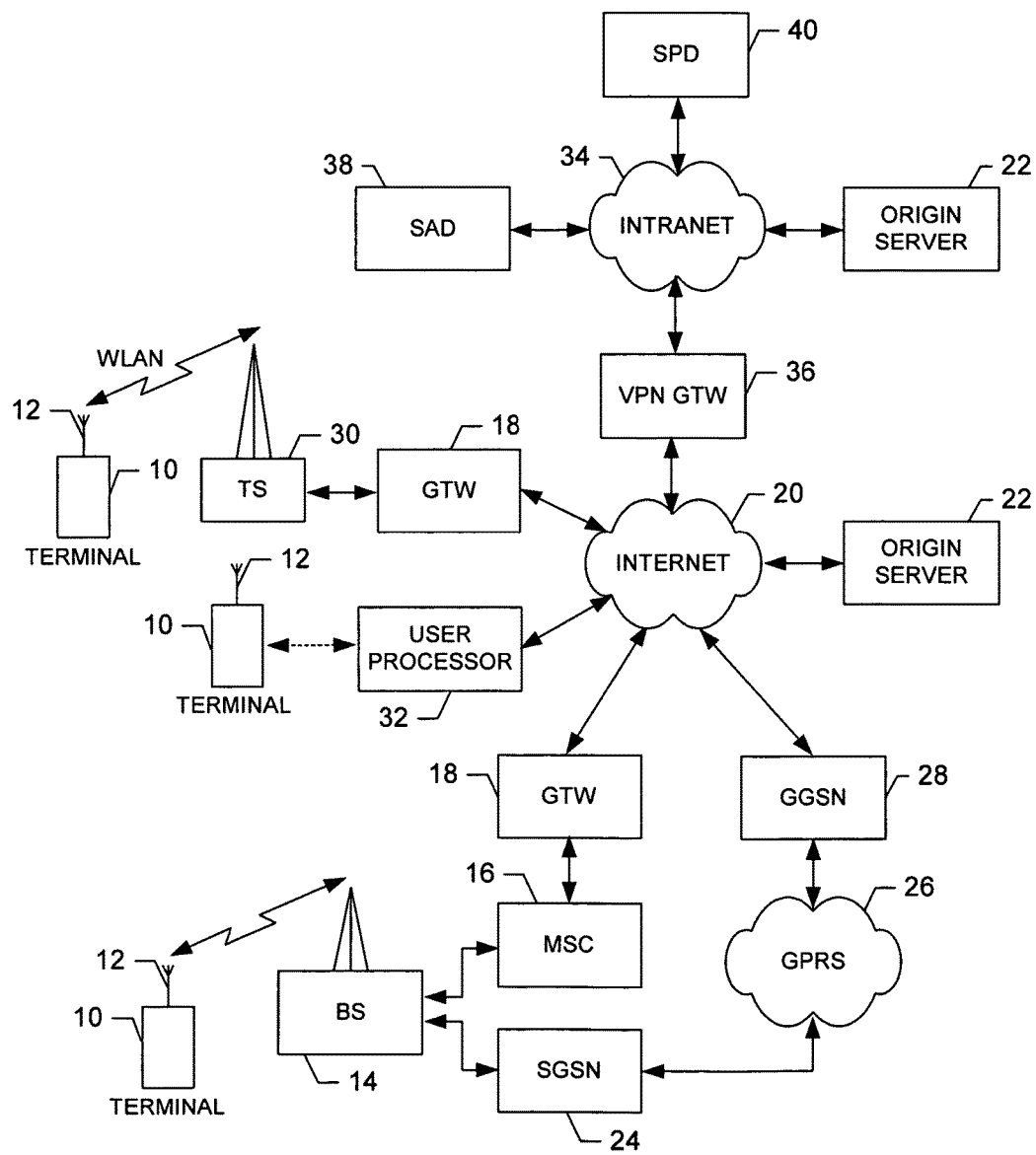
Figure 2:
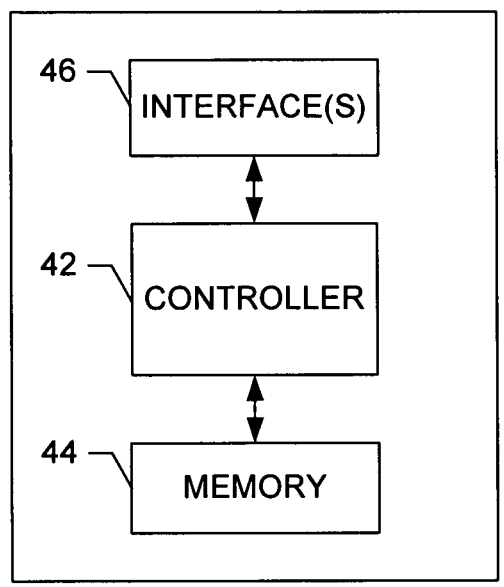
Figure 3:
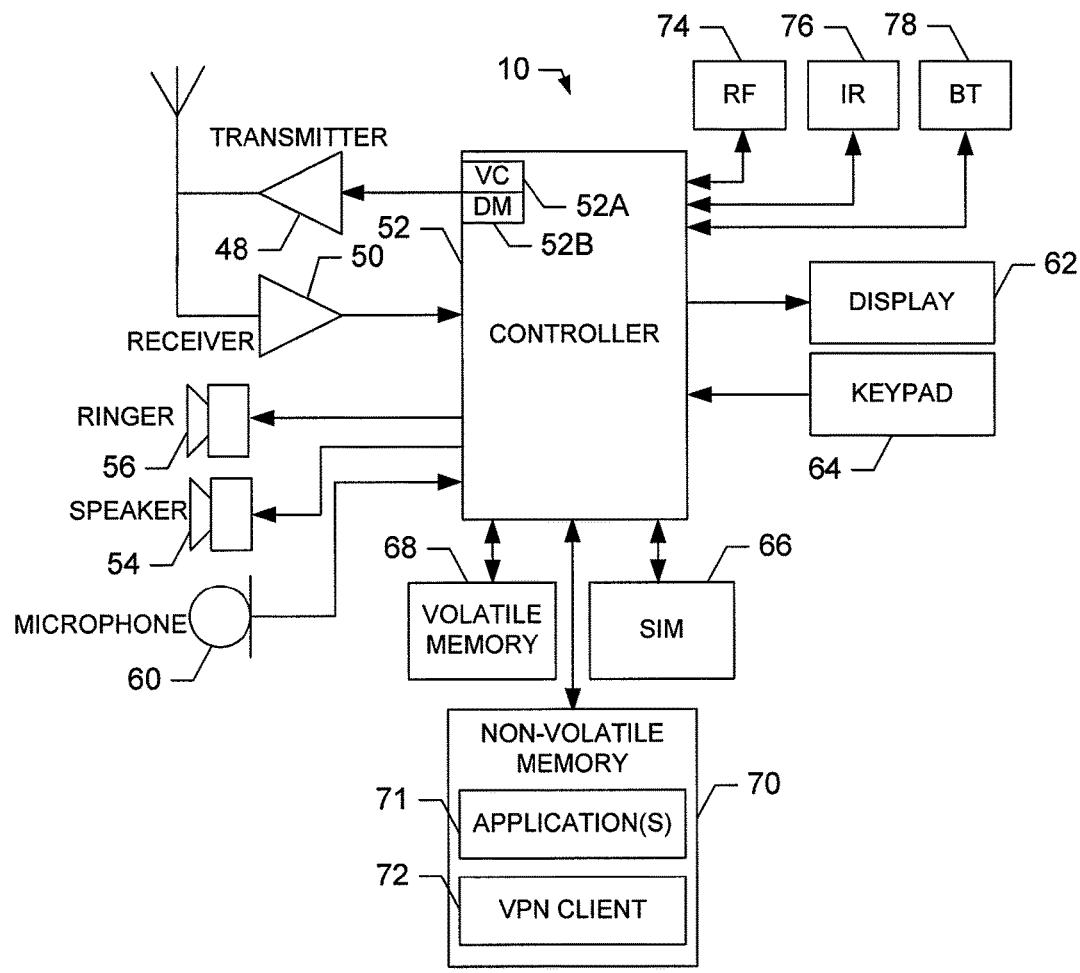
Figure 4:
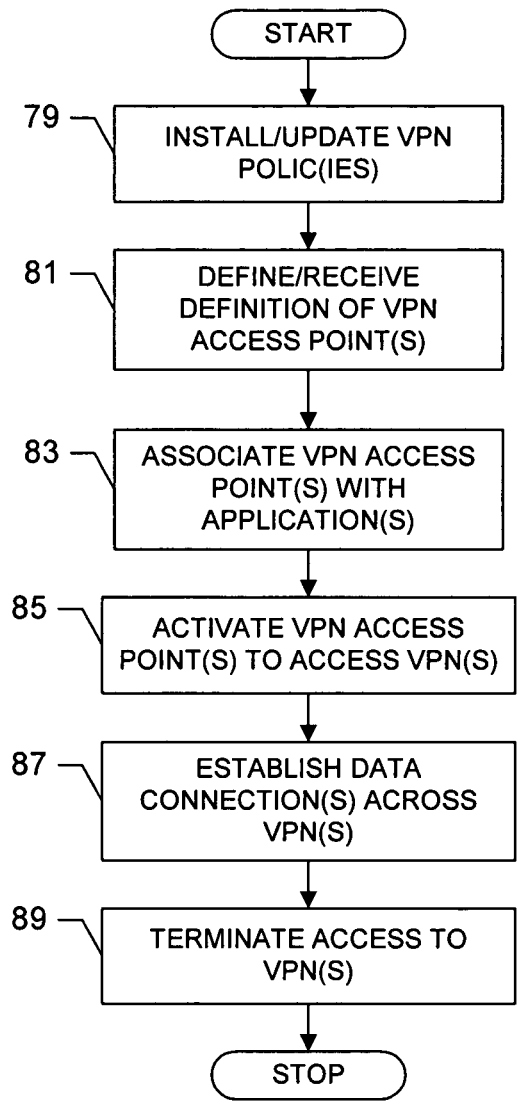
Figure 5A:
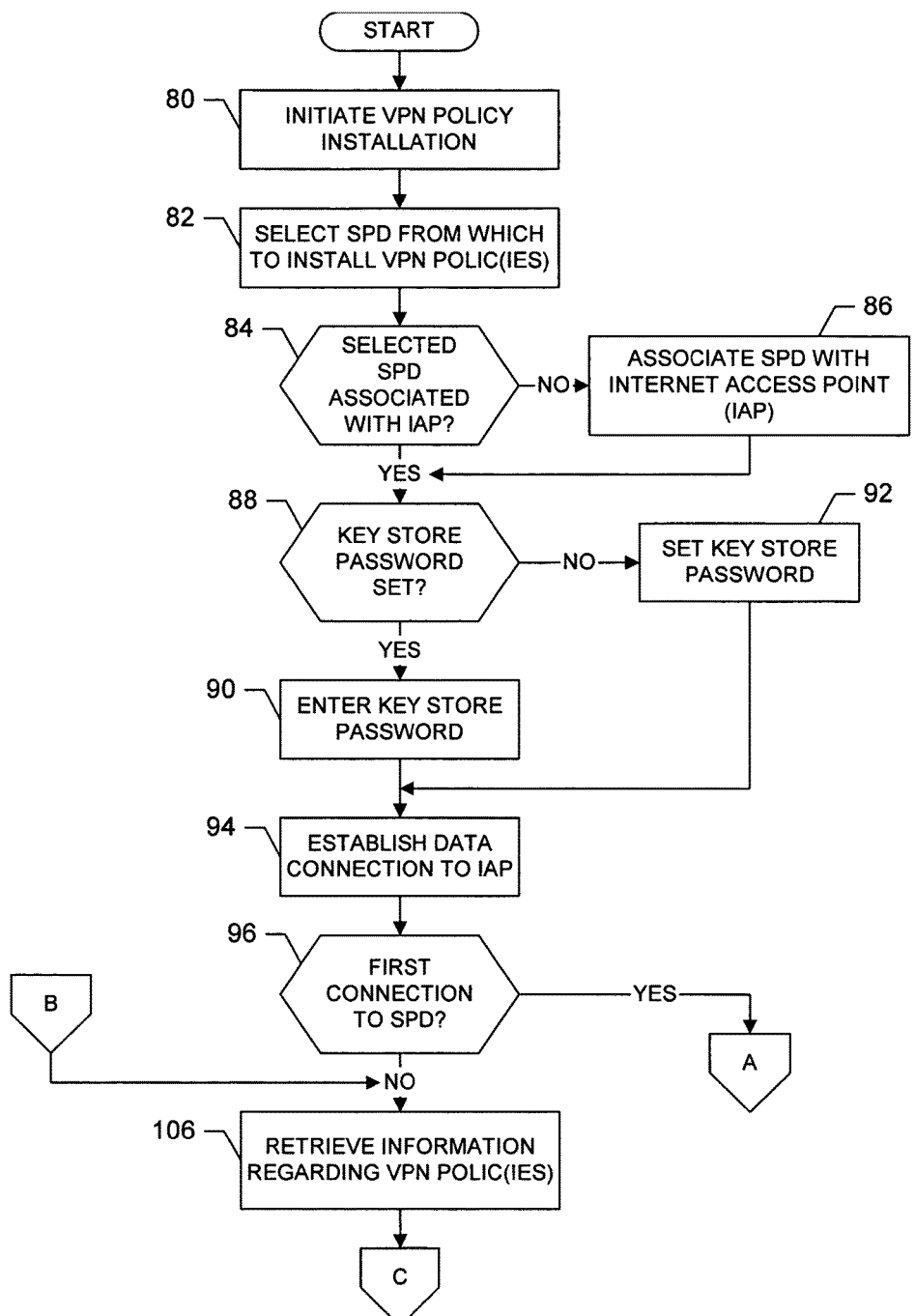
Figure 5B:
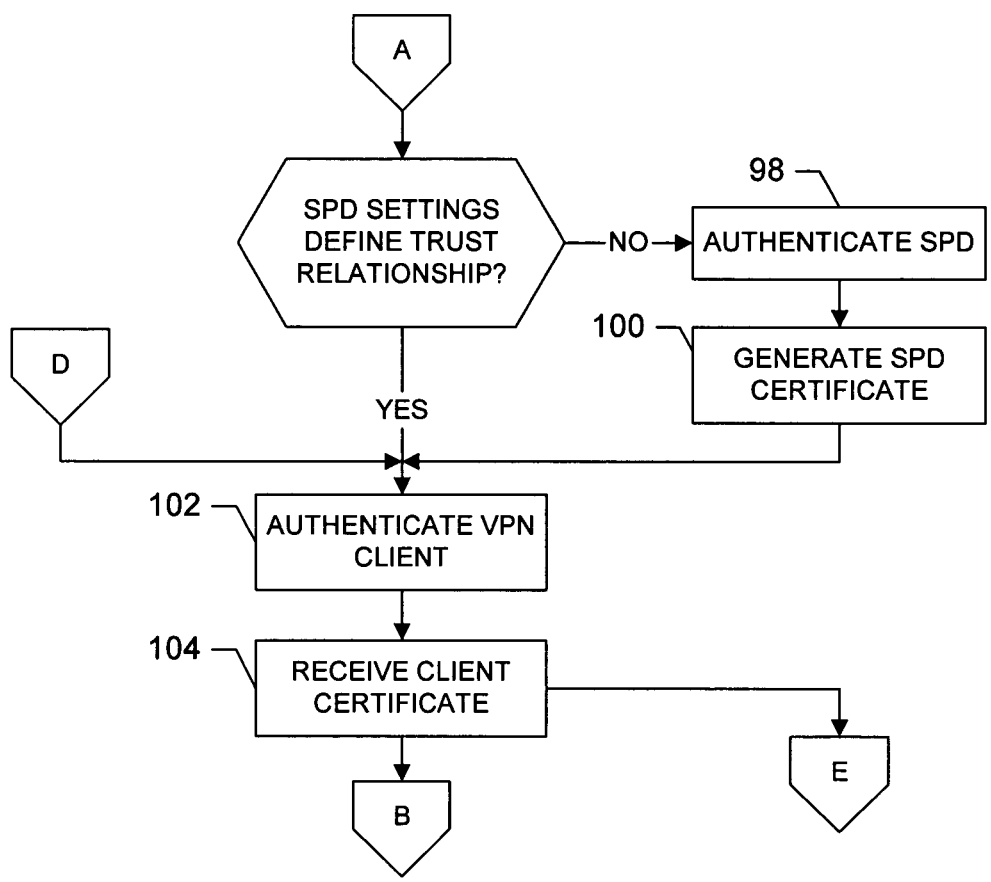
Figure 5C:
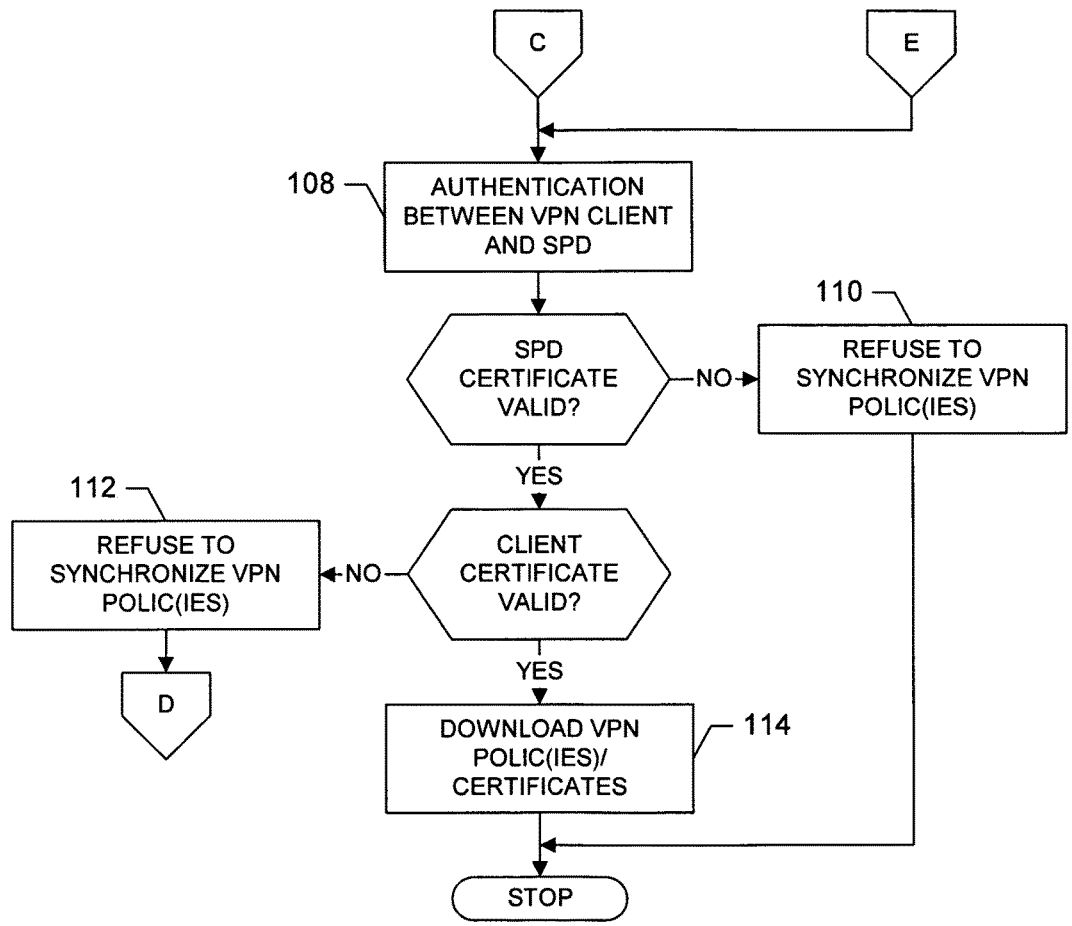
Figure 6:
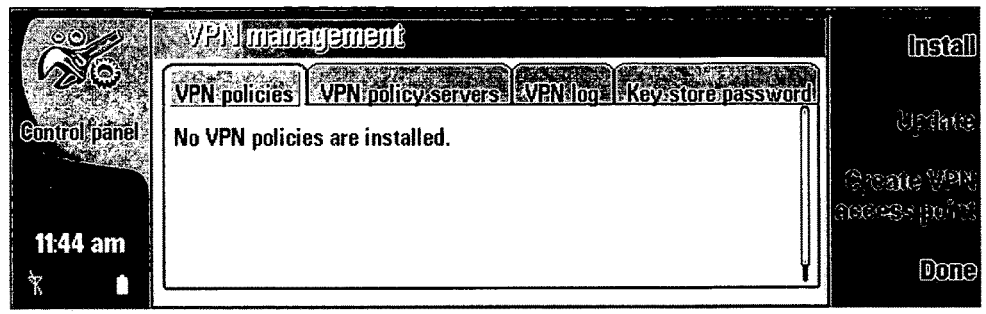
Figure 7:
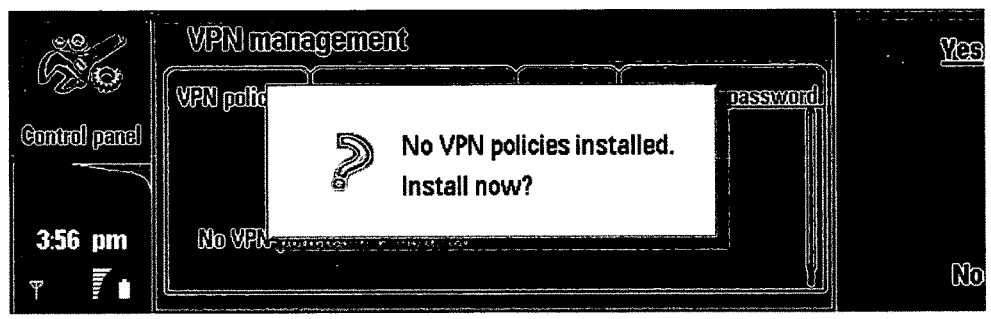

Having thus described the invention in general terms, reference will now be made to the accompanying drawings, which are not necessarily drawn to scale, and wherein:

FIG. 1 is a schematic block diagram of a wireless communications system according to one embodiment of the present invention including a mobile network and a data network to which a terminal is bi-directionally coupled through wireless RF links;

FIG. 2 is a schematic block diagram of an entity capable of operating as a network entity in accordance with embodiments of the present invention;

FIG. 3 is a schematic block diagram of a terminal according to one embodiment of the present invention;

FIG. 4 is a flowchart is shown that includes various steps in a method of accessing at least one VPN in accordance with one embodiment of the present invention;

FIGS. 5A-5C are flowcharts including various steps in a method of installing, storing or otherwise managing one or more VPN policies, in accordance with one embodiment of the present invention;

FIGS. 6-17 are exemplar displays capable of being presented by a VPN client during operation of embodiments of the present invention; and FIGS. 18A-18E are flowcharts including various steps in a method of activating, as well as deactivating, a VPN access point, in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of one or more cellular or mobile networks that each include elements required to operate the network, such as a mobile switching center (MSC) 16. The mobile network may also be referred to as a Base Station/MSC/Interworking function (BMI). In operation, the MSC is capable of routing calls to and from the terminal when the terminal is making and receiving calls. The MSC can also provide a connection to landline trunks such as, for example, when the terminal is involved in a call. In addition, the MSC can be capable of controlling the forwarding of messages to and from the terminal, and can also controlling the forwarding of messages for the terminal to and from a messaging center, such as short messaging service (SMS) messages to and from a SMS center (SMSC) (not shown).

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 18, and the GTW is coupled to a WAN, such as the Internet 20. In turn, devices such as processing elements (e.g., personal computers, server computers or the like) can be coupled to the terminal 10 via the Internet. For example, the processing elements can include one or more processing elements associated with one or more origin servers 22, one of which being shown in FIG. 1.

The BS 14 can also be coupled to a signaling GPRS (General Packet Radio Service) support node (SGSN) 24. The SGSN is typically capable of performing functions similar to the MSC 16 for packet-switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 26. The packet-switched core network is then coupled to another GTW, such as a GTW GPRS support node (GGSN) 28, and the GGSN is coupled to the Internet. Also, the GGSN can be coupled to a messaging center, such as a multimedia messaging service (MMS) center (not shown). In this regard, the GGSN and the SGSN, like the MSC, can be capable of controlling the forwarding of messages, such as MMS messages. The GGSN and SGSN can also be capable of controlling the forwarding of messages for the terminal to and from the messaging center. In addition, by coupling the SGSN 24 to the GPRS core network 26 and the GGSN 28, processing elements such as origin server(s) 22 can be coupled to the terminal 10 via the Internet 20, SGSN and GGSN. In this regard, devices such as origin server(s) can communicate with the terminal across the SGSN, GPRS and GGSN.

Although not every element of every possible mobile network is shown and described herein, it should be appreciated that the terminal 10 can be coupled to one or more of any of a number of different networks through the BS 14. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode terminals (e.g., digital/analog or TDMA/CDMA/analog phones).

The terminal 10 can further be coupled to one or more wireless transceivers (TSs) 30. The TSs can comprise access points configured to communicate with the terminal in accordance with techniques such as, for example, radio frequency (RF), Bluetooth (BT), infrared (IrDA) or any of a number of different wireless networking techniques, including WLAN techniques as shown in FIG. 1. Additionally, or alternatively, the terminal can be coupled to one or more user processors 32. Each user processor can comprise a computing system such as a personal computer, laptop computer or the like. In this regard, the user processors can be configured to communicate with the terminal in accordance with techniques such as, for example, RF, BT, IrDA or any of a number of different wireline or wireless communication techniques, including LAN and/or WLAN techniques. One or more of the user processors can additionally, or alternatively, include a removable memory capable of storing content, which can thereafter be transferred to the terminal.

The TSs 30 and the user processors 32 may be coupled to the Internet 20. Like with the MSC 16, the TSs and user processors can be directly coupled to the Internet. In one embodiment, however, the TSs are indirectly coupled to the Internet via a GTW 18. As will be appreciated, by directly or indirectly connecting the terminals 10 and the origin server(s) 22, as well as any of a number of other devices, processors or the like, to the Internet, the terminals can communicate with one another, the origin server(s), etc., to thereby carry out various functions of the terminal, such as to transmit data, content or the like to, and/or receive content, data or the like from, the service providers and/or authorization managers.

In accordance with embodiments of the present invention, the Internet 20, and thus the terminal 10, can be coupled to one or more Intranets 34, one of which is illustrated in FIG. 1. Each Intranet generally comprises a private network contained within an enterprise. Each Intranet can comprise one or more interlinked LANs, as well as portions of one or more LANs, MANs, WANs or the like. As with the Internet, devices such as processing elements (e.g., origin server(s) 22) can be coupled to the Intranet, and thus the Internet and terminal, via the Intranet. Like various other components of the system, the Intranet, and thus the processing elements of the Intranet, is typically indirectly coupled to the Internet, and thus the terminal, via a gateway 36. Similarly, although not shown, each network or portion of a network included within the Intranet can be interconnected with one another via a gateway.

As explained below, a terminal 10 is capable of accessing the Intranet 34, and thus processing elements (e.g., origin server(s) 22) coupled to the Intranet, by establishing a Virtual Private Network (VPN) across the gateway 36 to the Intranet, and if so required, across one or more other gateways within the Intranet. In such instances, then, the gateway is typically referred to as a VPN GTW, as shown in FIG. 1. In accordance with embodiments of the present invention, the system provides an IP security (IPsec) framework, substantially such as that described in Internet Engineering Task Force (IETF) request for comment document RFC 2401, entitled: *Security Architecture for the Internet Protocol*, the contents of which are hereby incorporated by reference in its entirety. As such, the Intranet is also coupled to processing elements comprising a Security Association Database (SAD) 38 and a Security Policy Database (SPD) 40. As will be appreciated, the SAD is capable of storing security associations of the processing devices (e.g., origin server(s) 22) within the Intranet 34 with processing devices, such as terminals 10, located across the VPN GTW 36. The SPD, on the other hand, is capable of storing the security policies that are enforced by the VPN GTW, where the security policies may be included within VPN policies that may also include one or more other pieces of information, as explained below. As described herein, the SAD and SPD are configured in accordance with IPsec and operated in conjunction with various IP layer protocols (e.g., Mobile IP). It should be understood, however, that the SAD and SPD can alternatively be configured with any of a number of other security protocols capable of operating consistent with embodiments of the present invention.

In accordance with IPsec, the SAD 38 comprises a database for storing security associations protecting outgoing traffic, and for storing security associations protecting incoming traffic. For outgoing traffic, for example, entries of the SAD can be pointed to by entries of the SPD 40. More particularly, each entry in the SAD may include one or more of the following fields: destination IP address, IPsec protocol (Authentication Header (AH) or Encapsulating Security Payload (ESP)), and an SPI (Security Parameters Index). Additionally, each entry may include a sequence number counter, a sequence counter overflow, an anti-replay window, mode and/or lifetime fields. Further, each entry may include cryptographic parameters including encryption and authentication key parameters such as, for example, AH parameters, ESP parameters for authentication, and/or ESP parameters for ciphering.

As defined by IPsec, the SPD 40 comprises a database for storing VPN policies that can include security policies enforced by the VPN GTW 36. Like with the SAD 38, the SPD stores security policies for outgoing traffic and for incoming traffic, typically storing each separately. Generally, the VPN GTW utilizes the SPD to determine what traffic must be protected, such as by IPsec. Then, when particular traffic must be protected, the SPD defines what security services must be applied, where the actions may define either (a) discard, (b) relay (i.e., relay without applying security services) or (c) IPsec (apply security services).

The SPD stores the security policies indexed by selectors that describe the traffic to which respective security policies are to be applied. Each VPN policy typically defines an action to take (i.e., discard, relay or IPsec), as well as algorithms and protocols to apply when IPsec is specified as the action to be taken. According to IPsec, selectors are typically defined by the following fields: destination IP address, source IP address, name, data sensitivity level, transport layer protocol, and/or source and destination ports. In addition to, or in lieu of, the preceding IPsec fields, in accordance with embodiments of the present invention, the selectors may be defined by one or more user defined fields.

As shown and described above, a terminal 10 is capable of accessing the Internet 20, and thus the VPN GTW 36 and Intranet 34, in any of a number of different manners. For example, a terminal can be capable of accessing the Internet via a TS 30 and/or user processor 32. Additionally or alternatively, a terminal can be capable of accessing the Internet via the MSC 16, such as to provide circuit-switched connectivity. Further, the terminal can additionally or alternatively be capable of accessing the Internet via the SGSN 24, such as to provide circuit or packet-switched connectivity across the GPRS core network 26. As used herein, such IAPs are referred to as "Internet Access Points" or IAPs. Although a terminal can access the Internet via any one or more of the aforementioned IAPs, it should be understood that the above IAPs are merely illustrative of the number of different IAPs by which the terminal can be capable of accessing the Internet.

Reference is now made to FIG. 2, which illustrates a block diagram of an entity capable of operating as a network entity, such as a GTW 18, originating node 22, TS 30, user processor 32, VPN GTW 36, SAD 38, SPD 40, in accordance with one embodiment of the present invention. Although shown as separate entities, in some embodiments, one or more entities may support one or more of the network entities, logically separated but co-located within the entit(ies). For example, a single entity may support a logically separate, but co-located, SAD and SPD. Also, for example, a single entity may support a logically separate, but co-located VPN GTW, SAD and SPD.

As shown, the entity capable of operating as a network entity can generally include a controller 42, processor or the like connected to a memory 44. The controller can also be connected to at least one interface 46 or other means for transmitting and/or receiving data, content or the like. The memory can comprise volatile and/or non-volatile memory, and typically stores content, data or the like. For example, the memory typically stores software applications, instructions or the like for the controller to perform steps associated with operation of the entity in accordance with embodiments of the present invention. Also, as indicated above, when the entity comprises a SAD 38, the memory typically stores security associations protecting incoming and/or outgoing traffic with respect to the Intranet 34. In addition, as also indicated above, when the entity comprises a SPD 40, the memory typically stores VPN policies that can include security policies enforced by the VPN GTW 36.

FIG. 3 illustrates a functional diagram of a terminal 10, according to one embodiment of the invention. It should be understood, that the terminal illustrated and hereinafter described is merely illustrative of one type of mobile terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of voice and text communications systems, can readily employ the present invention.

The terminal 10 of the embodiment illustrated in FIG. 3 includes a transmitter 48, a receiver 50, and a controller 52, processor or the like that provides signals to and receives signals from the transmitter and receiver, respectively. These signals include signaling information in accordance with the air interface standard of the applicable cellular system, and also user speech and/or user generated data. In this regard, the terminal 10 can be capable of operating with one or more air interface standards, communication protocols, modulation types, and access types. More particularly, the terminal can be capable of operating in accordance with any of a number of 1G, 2G, 2.5G and/or 3G communication protocols or the like. For example, the terminal may be capable of operating in accordance with 2G wireless communication protocols IS-136 (TDMA), GSM, and IS-95 (CDMA). Also, for example, the terminal may be capable of operating in accordance with 2.5G wireless communication protocols GPRS, Enhanced Data GSM Environment (EDGE), or the like. Some narrow-band AMPS (NAMPS), as well as TACS, terminals may also benefit from embodiments of the present invention, as should dual or higher mode terminals (e.g., digital/analog or TDMA/CDMA/analog phones).

It is understood that the controller 52 includes the circuitry required for implementing the audio and logic functions of the terminal 10. For example, the controller may be comprised of a digital signal processor device, a microprocessor device, and various analog to digital converters, digital to analog converters, and/or other support circuits. The control and signal processing functions of the terminal are allocated between these devices according to their respective capabilities. The controller thus also includes the functionality to convolutionally encode and interleave message and data prior to modulation and transmission. The controller can additionally include an internal voice coder (VC) 52A, and may include an internal data modem (DM) 52B. Further, the controller may include the functionally to operate one or more software applications, which may be stored in memory.

The terminal 10 also comprises a user interface including a conventional earphone or speaker 54, a ringer 56, a microphone 60, a display 62, and a user input interface, all of which are coupled to the controller 52. The user input interface, which allows the terminal to receive data, can comprise any of a number of devices allowing the terminal to receive data, such as a keypad 64, a touch display (not shown) or other input device. In embodiments including a keypad, the keypad includes the conventional numeric (0-9) and related keys (#, *), and other keys used for operating the terminal.

The terminal 10 can also include memory, such as a subscriber identity module (SIM) 66, a removable user identity module (R-UIM) or the like, which typically stores information elements related to a mobile subscriber. In addition to the SIM, the terminal can include other memory. In this regard, the terminal can include volatile memory 68, such as volatile Random Access Memory (RAM) including a cache area for the temporary storage of data. The terminal can also include other non-volatile memory 70, which can be embedded and/or may be removable. The memories can store any of a number of pieces of information, and data, used by the terminal to implement the functions of the terminal. For example, the memories can include an identifier, such as an international mobile equipment identification (IMEI) code, capable of uniquely identifying the terminal, such as to the MSC 16.

Also, for example, the memories 66, 68 and 70 can include one or more connectivity applications 71, such as a conventional Web browser that allows the terminal 10 to transmit and receive Web content, and/or a conventional E-mail application that allows the terminal to transmit and receive E-mail messages or the like. In addition, for example, the non-volatile memory can store an operating system (not shown), such as Symbian OS version 7.0s or later, developed by Symbian Limited of the United Kingdom. Further for example, as described in more detail below, the non-volatile memory can store a VPN client 72 capable of establishing one or more VPN connections in accordance with a security protocol, such as IPsec.

As shown and described herein, applications such as the VPN client 72 comprise software executed by a terminal 10, such as by the controller 52 of the terminal. It should be understood, however, that the functions of the VPN client can equally be implemented in hardware, firmware or the like, without departing from the spirit and scope of the present invention. It should also be understood that although the VPN client is shown and described as being co-located with the terminal, the VPN client can equally be distributed from the terminal.

The terminal 10 can further include one or more means for sharing and/or obtaining data from electronic devices, such as other network entities, in accordance with any of a number of different wireline and/or wireless techniques. For example, the terminal can include a radio frequency (RF) transceiver 74 and/or an infrared (IR) transceiver 76 such that the terminal can share and/or obtain data in accordance with radio frequency and/or infrared techniques. Also, for example, the terminal can include a Bluetooth (BT) transceiver 78 such that the terminal can share and/or obtain data in accordance with Bluetooth transfer techniques. Although not shown, the terminal may additionally or alternatively be capable of transmitting and/or receiving data from electronic devices according to a number of different wireline and/or wireless networking techniques, including local area network (LAN) and/or wireless LAN (WLAN) and/or other wireless techniques.

As indicated in the background section, in conventional techniques for communicating over a VPN typically require a client, such as a terminal 10, to establish a VPN connection by establishing communication with an IAP to the physical network(s) including the respective VPN, and thereafter loading or activating the VPN policy for the respective VPN. Terminating the VPN connection, typically requires that the client unload or deactivate the VPN policy for the respective VPN, and thereafter terminate communication with the IAP. Such techniques for initiating and terminating VPN connections, however, can place an undesirable burden on the client or client user, particularly as the number of simultaneous VPN and other connections of clients increase in "multi-homed" clients.

In accordance with embodiments of the present invention, then, a terminal 10 is capable of establishing and actively maintaining one or more VPNs such as in a "single-homed" and/or "multi-homed" configuration. More particularly, operating as a "multi-homed" client, the terminal is capable of establishing and actively maintaining a plurality of VPN connections (and VPN policies) over one or more IAPs at the same time. Also, the terminal is capable of maintaining one or more active VPN connections simultaneous with one or more additional connections to one or more of the same or different IAPs independent of the VPN connections. In operation, in contrast to conventional "multi-homed" clients, the terminal is further capable of establishing each VPN connection without requiring the terminal, or terminal user, to separately establish communication with an IAP to the respective physical network(s), loading or activating the VPN policy for the respective VPN, and subsequently thereafter unloading or deactivating the VPN policy for the respective VPN, and terminating communication with the IAP.

To effectuate a method of accessing VPN(s) in accordance with embodiments of the present invention, the terminal 10, or more particularly the terminal user, is capable of defining one or more "VPN access points." As explained below, a VPN access point can generally be considered a virtual or logical access point to a respective VPN. In this regard, a VPN access point can be defined by a VPN policy and an associated IAP, and can be identified by a name or other identifier. Utilizing VPN access points, then, the terminal can establish and actively maintain one or more VPN connections much in the same manner as IAPs, with the VPN connections having the attributes of similar VPN connections established in accordance with conventional techniques.

As explained in greater detail below, when a terminal 10, or more particularly a terminal user or an application operating on the terminal, establishes a VPN connection, a VPN client 72 operating on the terminal is capable of accessing the VPN utilizing a respective VPN access point. As used herein, then, each such VPN connection is referred to as a "VPN access point connection." More particularly, to establish a VPN access point connection, the VPN client is capable of interpreting a respective VPN access point to establish a connection with an associated IAP, load an associated VPN policy, and thereafter establish a VPN tunnel over the IAP connection. Then, to terminate the VPN access point connection, the VPN client is capable of closing the VPN tunnel, unloading the associated VPN policy, and thereafter permitting the terminal to terminate the connection to the associated IAP, provided the terminal is otherwise disengaged from the associated IAP.

Using VPN access points, then, the VPN client 72 is capable of integrating establishment and termination of VPN tunnels into typical establishment and termination of connections to IAPs. As such, in contrast to conventional techniques, the terminal 10 or terminal user need not separately perform steps to establish a VPN connection, or use a dedicated VPN User Interface (UI) to load and unload VPN policies in a coordinated fashion with regard to establishing and terminating IAP connections.

As indicated above, and as further explained below, the terminal 10 is capable of actively maintaining connection to a plurality of VPN access point connections at the same time by connecting to a plurality of VPNs utilizing respective VPN access points. In addition, one or more VPN access point connections can actively coexist within the terminal with one or more connections to one or more of the same or different IAPs independent of the respective VPN access point connections. When the terminal actively maintains a plurality of simultaneously active access point connections, a plurality of VPN policies are also simultaneously active. However, each VPN policy only affects traffic over a respective VPN access point connection. In this regard, to permit such separation of VPN policies, the traffic selectors in the VPN policies can include network identifiers (IDs) associated with respective VPN access point connections.

Referring to FIG. 4, a flowchart is shown that includes various steps in a method of accessing at least one VPN in accordance with one embodiment of the present invention. As shown, the method includes establishing and actively maintaining one or more VPN access point connections. Before the terminal 10 can establish and actively maintain one or more VPN access point connections, however, respective VPN access points are typically defined, each including a name or other identifier, and an associated VPN policy and IAP. Further, as shown in block 79 of FIG. 4, before defining one or more VPN access points, one or more VPN policies can be installed, updated or otherwise stored in memory (e.g., non-volatile memory 70) of the terminal, such as by the VPN client 72, as shown in block 80. More particularly, the VPN client can be capable of installing VPN policies selected from one or more different types of VPN policies, including user-specific certificate policies, generic certificate policies and generic non-certificate policies.

User-specific certificate policies typically include information required by the VPN client 72 to establish secure tunnels to a VPN GTW 36. More particularly, for example, the user-specific certificate policies can include one or more security policies. In addition, the user-specific certificate policies can include one or more other pieces of information such as, for example, one or more certificate authority (CA) certificates, one or more VPN GTW certificates, and/or one or more VPN client private key/certificate pairs. In contrast to user-specific certificate policies, generic certificate policies typically lack user-specific information such as VPN client private key/certificate pairs. Thus, for generic certificate policies, the VPN client can be capable of generating a private key for the VPN client and acquiring a corresponding certificate, such as via a certificate enrollment technique. Further, in contrast to user-specific and generic certificate policies, generic non-certificate policies typically require username-password-type VPN authentication and can be ready for use immediately after installation.

As will be appreciated, in enterprises including SPDs 40 from which the VPN client 72 is capable of installing one or more VPN policies, respective system administrators typically create VPN polic(ies). The VPN policies can then be exported to respective SPDs to make the VPN polic(ies) available to the VPN client. Additionally or alternatively, respective system administrators can package VPN polic(ies) into files, such as Symbian Installation System (SIS) files. Files including the policies can then be delivered to the VPN client, which can thereafter install or otherwise store in memory (e.g., non-volatile memory 70) the policies from the files.

Reference will now be made to FIGS. 5A-5C, which illustrate flowcharts including various steps in a method of installing, storing or otherwise managing one or more VPN policies by the VPN client 72 within memory (e.g., non-volatile memory 70) of the terminal 10. As shown, a method of installing VPN polic(ies) includes activating, such as via input to a terminal user interface (e.g., keypad 64), a VPN policy installation procedure within the VPN client 72, as shown in block 80. The VPN policy installation/updating procedure can be activated in any of a number of different manners including, for example, opening a "VPN Policies" page or display of the VPN client, or more particularly a VPN management control panel applet of the VPN client. Thereafter, the terminal user can select to install VPN policies from the "VPN Policies" display, such as by selecting an "Install" command, as shown in the exemplar VPN client display of FIG. 6.

Alternatively, in instances where the terminal 10 does not include any installed VPN polic(ies), the VPN client 72 can proactively request installation of one or more such policies. For example, as shown in the exemplar VPN client display of FIG. 7, the VPN client can present a confirmation dialog including the following statement and request: "No VPN policies installed. Install now?" If the terminal user elects to forgo installing VPN policies in response to such a request, the VPN client typically does not initiate installation of VPN policies, and can again present the "VPN Policies" display indicating that no VPN policies are installed, as shown in the exemplar VPN client display of FIG. 6. At any point thereafter, the terminal user can select to install VPN policies from the "VPN Policies" display, such as by selecting the "Install" command.

If or when the terminal user elects to install VPN polic(ies), the terminal 10 can receive a selection of a SPD 40 from which to install/update VPN polic(ies), such as from a list of SPD(s) presented by the VPN client 72, as shown in block 82. As illustrated in the exemplar display of FIG. 8, for example, the VPN client 72 can present, such as on a "VPN Policy Servers" display, an alphabetical list of one or more SPDs. As will be appreciated, if the list only includes a single SPD, the VPN client can be configured to automatically select the listed SPD.

After selecting the SPD 40 from which to install/update VPN polic(ies), the VPN client 72 can be capable of identifying whether the selected SPD has an associated IAP via which the terminal is capable of accessing the selected SPD to install VPN polic(ies) stored by the SPD, as shown in block 84. The VPN client can identify an associated IAP in any of a number of different manners, such as based upon SPD settings stored in memory of the terminal that define the selected SPD. In this regard, the VPN client 72 can store, in memory of the terminal 10, SPD settings that define one or more SPDs 40, where the SPD settings can include, in addition to IAP associations, the address(es) (e.g., IP addresses) of the SPD(s) and, if so desired, information defining a trust relationship between the terminal 10 and respective SPD(s).

As will be appreciated, in various instances the selected SPD 40 may not have an associated IAP, such as may be the case in instances where the SPD settings have been stored in memory (e.g., non-volatile memory 70) of the terminal in an offline manner such as from a SIS (Symbian Installation System) file. In such instances, the VPN client 72 can receive a selection of an IAP, such as from a list of available IAPs presented by the VPN client, as shown in block 86. Similar to the case of a single SPD, if the list only includes a single IAP, the VPN client can be configured to automatically select the listed IAP. Irrespective of how the VPN client receives the selection of the IAP, the VPN client can thereafter store the selection in SPD settings defining the previously selected SPD.

Once the selected SPD 40 has an associated IAP, the VPN client 72 can request that the terminal user set or enter a key store password to facilitate authenticating the terminal 10, or more particularly the VPN client, to the selected SPD, as shown block 88. More particularly, terminal users typically set and thereafter use a key store password to protect a key store in memory (e.g., non-volatile memory 70) of the terminal or, more particularly, to protect private keys (explained below) for VPN authentication and/or SPD authentication that are included within the key store. In this regard, the key store password is typically set to protect private keys for SPD authentication, which the VPN client can receive from the SPD the first time the VPN client connects to the SPD, such as to synchronize VPN policies stored by the SPD with the terminal, as explained below.

Figure 9:
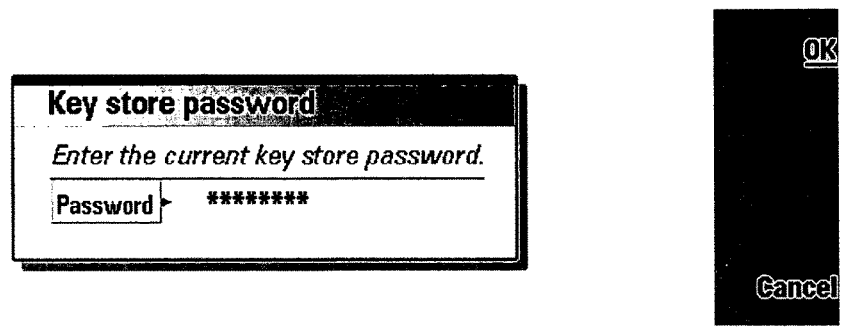
Figure 10:

If the key store password has previously been set, the VPN client 72 can request, and thereafter receive from the terminal user, the respective key store password, as shown in block 90 and the exemplar VPN client display of FIG. 9. It should be appreciated, however, that in various instances the VPN client can store the set key store password in memory (e.g., non-volatile memory 70) of the terminal 10. In such instances, the VPN client can be capable of retrieving the key store password from memory without requesting the key store password from the terminal user. If the key store password has not yet been set or stored in memory, however, the VPN client can request, and thereafter receive from the terminal user, a new key store password, as shown in block 92 and in the exemplar VPN client display of FIG. 10.

After setting or receiving a key store password, the VPN client 72 can establish a data connection to the IAP associated with the selected SPD 40 to thereby establish a data connection to the SPD, as shown in block 94. Thereafter, the VPN client can establish a data connection to the SPD to download, receive or otherwise synchronize the one or more VPN policies from the SPD. Before synchronizing the VPN polic(ies) from the SPD, the VPN client may authenticate the SPD and/or authenticate itself to the SPD, particularly in instances where the VPN client desires, but does not otherwise have, a trust relationship with the SPD. The VPN client can authenticate the SPD and/or itself to the SPD in any of a number of different manners. In one embodiment, for example, the VPN client can perform such authentication(s) using a SPD certificate and/or user certificate in accordance with a certificate authentication technique. In such instances, the VPN client can be capable of storing, in memory (e.g., non-volatile memory 70) of the terminal 10, such as in the password-protected key store, a SPD certificate and/or user certificate with respect to the selected SPD.

The SPD and user certificates can be generated in any of a number of different manners, but in one typical embodiment, are generated the first time the VPN client attempts to establish a data connection with the SPD, as shown in block 96. In such instances, when the SPD settings do not otherwise include information defining a trust relationship between the terminal 10 and selected SPD, the VPN client can authenticate the SPD. The VPN client can authenticate the SPD in any of a number of different manners, such as by checking and requesting the terminal user to complete a SPD identity code presented by the VPN client, as shown in block 98. In such instances, a system administrator of the SPD can deliver the identity code to the terminal user before the VPN client authenticates itself to the SPD, typically in a manner independent of a connection between the terminal and the SPD.

More particularly, the VPN client 72 can request, and thereafter receive from the terminal user, confirmation of the SPD identity code. In this regard, the VPN client can present a SPD identity code dialog that includes the SPD identity code with one or more missing characters, and can request, and thereafter receive from the terminal user, the missing characters. For example, if the server identity code comprises: "3E:1F:9E:E6:4C:6E:F0:22:08:25:DA:91:23:08:05:03," the VPN client can present a dialog that includes the request: "Verify the server identity code by entering the missing characters: 3E:1F:_E:E6:4C:6E:F0:2_:08:25:DA:9_:23:08:_5:03." In such an instance, the VPN client can receive, from the terminal user, the string "9210" to thereby complete the SPD identity code. Irrespective of how the VPN client 72 authenticates the selected SPD 40, upon authenticating the SPD, the VPN client can generate and thereafter store the SPD certificate for authenticating the SPD during subsequent communications, as shown in block 100.

Like generating the SPD certificate, the user certificate can be generated in any of a number of different manners. Similar to before, the first time the VPN client 72 attempts to establish a data connection with the SPD, the VPN client can authenticate itself to the SPD. The VPN client can authenticate itself to the SPD in any of a number of different manners, such as via a username/password combination, as shown in block 102. Similar to before, irrespective of how the VPN client authenticates itself to the selected SPD, the SPD can thereafter generate (or retrieve from a certification authority) a client certificate, and send the client certificate to the VPN client. Upon receiving the client certificate, then, the VPN client can store the client certificate for authenticating the SPD during subsequent communications, as shown in block 104.

As indicated above, before downloading VPN polic(ies) from the SPD 40, the VPN client 72 may authenticate the SPD and/or authenticate itself to the SPD. More particularly, before downloading VPN polic(ies) from the SPD, the VPN client can retrieve, from the SPD, information regarding the VPN polic(ies) available to the VPN client, as shown in block 106. During this information retrieval, then, the VPN client may authenticate the SPD and/or authenticate itself to the SPD, as shown in block 108. In this regard, if the SPD certificate has expired, been revoked or is otherwise invalid, the SPD can refuse to synchronize VPN polic(ies) with the VPN client, as shown in block 110. In such instances, if so desired, the VPN client can notify the terminal user of the authentication failure, such as by presenting, to the terminal user, information dialog (e.g., "Policy server logon failed. Delete and re-create the server definition."). The terminal user can thereafter redefine the SPD in the list of SPD(s), such as during management of the list of and settings of such SPD(s), as explained below. The terminal user can then restart the VPN policy installation process, selecting the redefined SPD.

Likewise, if the client certificate has expired, been revoked or is otherwise invalid, the VPN client 72, or more particularly the SPD 40, can refuse to synchronize the VPN polic(ies) with the VPN client, as shown in block 112. In such instances, the SPD can thereafter generate a new client certificate, such as in the same manner as before (see blocks 100, 102). The VPN client can then again attempt to authenticate itself to the SPD using the newly generated client certificate.

If the SPD certificate and client certificate are both valid, and authentication between the VPN client 72 and SPD 40 is successful, the VPN client can synchronize VPN polic(ies) stored by the SPD. More particularly, the VPN client can download, from the SPD, the VPN polic(ies) and associated certificates (for user-specific or generic certificate policies) stored, generated or otherwise received by the SPD, as shown in block 114. Upon completing the policy download, or synchronization, the VPN client can notify the terminal user that the policy synchronization has been completed, if so desired.

Also, after the VPN client has received the VPN polic(ies), the VPN client 72 can install or otherwise store the respective polic(ies). For example, the VPN client can package the security polic(ies) in a policy file, and along with information regarding the security polic(ies), store the policy file in a VPN policy store. Additionally, for example, for user-specific and generic certificate policies, the VPN client can store the certificate(s) and private key/certificate pair(s) in the password-protected key store. In this regard, before storing VPN client private key/certificate pairs for generic certificate policies, during installation, the VPN client can be capable of generating a private key for the VPN client and acquiring a corresponding certificate, such as via a certificate enrollment technique. Irrespective of how the VPN polic(ies) are installed, the VPN client can thereafter present the installed VPN polic(ies), such as on the "VPN Policies" page or display, as shown in exemplar VPN client display of FIG. 11.

As will be appreciated, once VPN polic(ies) has been installed by the VPN client 72, the VPN client can thereafter manage the respective VPN polic(ies), such as by updating, editing, deleting or otherwise modifying the respective VPN polic(ies). The VPN polic(ies) can be updated in any of a number of different manners. In one typical embodiment, however, the VPN polic(ies) are updated in a manner similar to the manner of installing the respective polic(ies). More particularly, the VPN polic(ies) can be updated by re-synchronizing the VPN client with the respective SPD 40, particularly when the VPN polic(ies) were previously installed from a SPD. During each synchronization with the SPD, then, the installed VPN polic(ies) of the SPD that are stored in memory (e.g., non-volatile memory 70) of the terminal can be updated, deleted or otherwise modified based upon the VPN polic(ies) currently stored in by the SPD.

Figure 11:
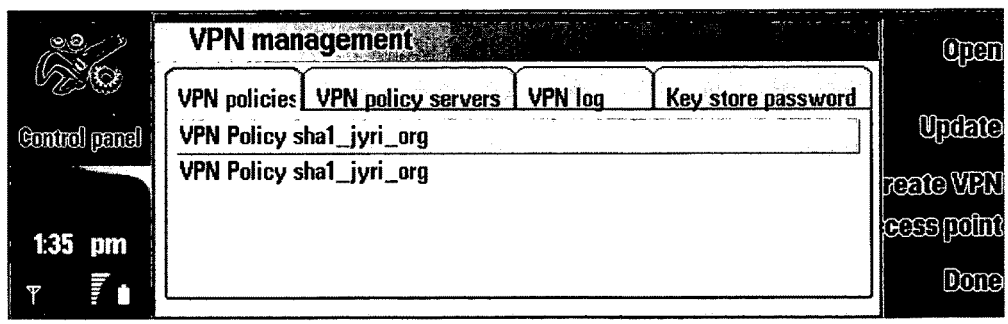
Figure 12:
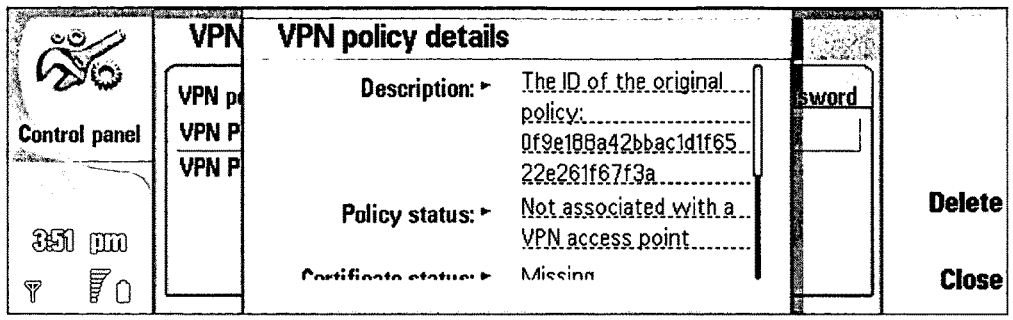
Figure 13:
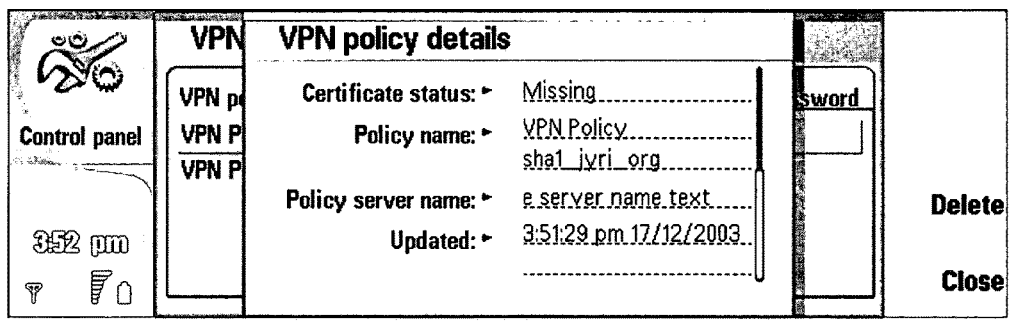
Figure 14:
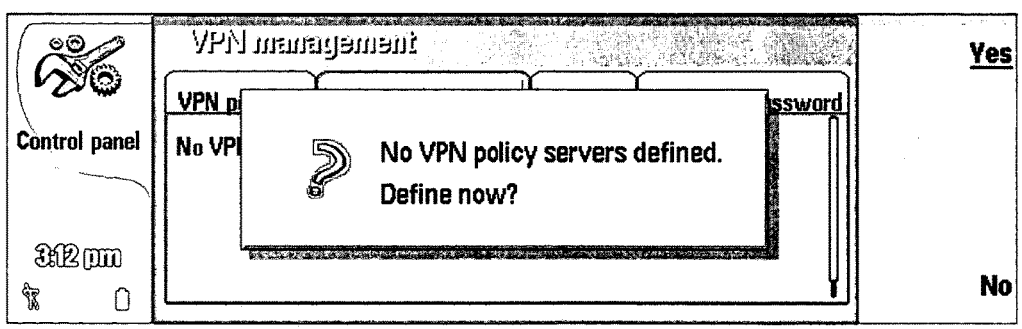
Figure 15:
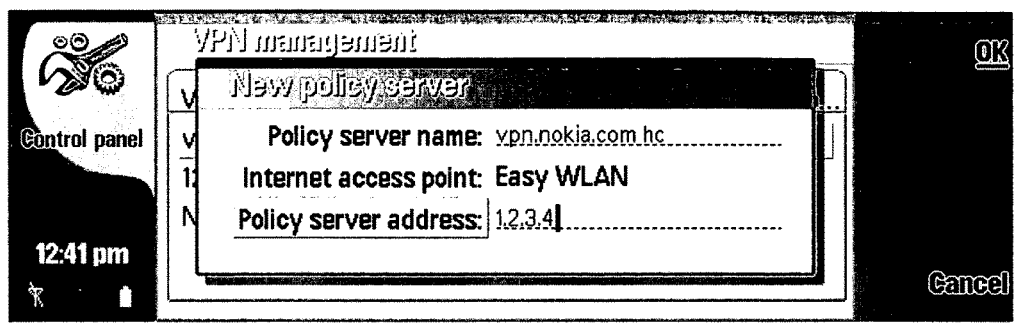

Also, during management of the VPN polic(ies), the VPN client 72 can be capable of presenting a list of the installed VPN polic(ies) to the terminal user (see FIG. 11). From this list, then, the terminal user can elect to view detailed information regarding the VPN polic(ies), as well as delete, edit or update one or more of the VPN polic(ies). For example, the terminal user can select an installed VPN policy, and thereafter elect to view detailed information regarding the VPN policy, as shown in the exemplar VPN client displays of FIGS. 12 and 13. The VPN policy can include any of a number of different pieces of information, one or more of which can be included in the detailed information regarding the VPN policy.

For example, the VPN policy can include a "policy name," such as that specified by a system administrator, and a "description" that includes additional regarding the VPN policy, such as information included within the VPN policy by the system administrator. Also, for example, the VPN policy can include a "policy server name" that indicates the SPD 40 from which the VPN client 72 installed the VPN policy, provided that the VPN client installed the VPN policy from an SPD. In addition, for example, the VPN policy can include a "policy status" that indicates whether the VPN policy is ready to use, or whether the VPN policy is already in use, such as in an active or inactive VPN access point (explained below). In addition, for example, the VPN policy can include a "certificate status" that indicates whether the user certificates (zero or more) associated with the VPN policy are currently valid, expired, missing, not yet valid or the like. Further, for example, the VPN policy can also include an "update" indication of when the VPN policy was last updated from a respective SPD, again presuming the VPN client installed the VPN policy from a SPD.

Figure 8:
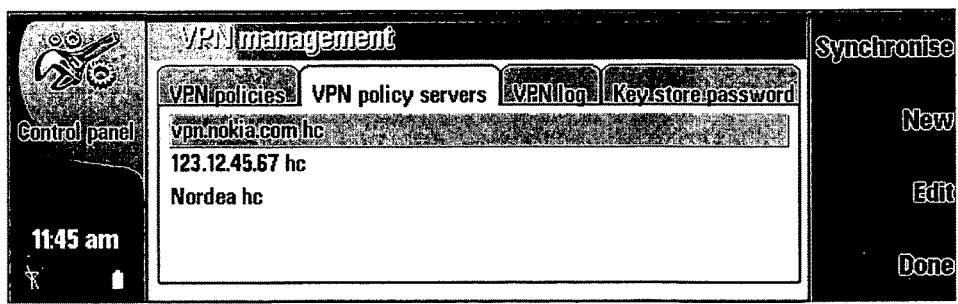

In addition to managing the VPN polic(ies), the VPN client 72 can also be capable of managing the list of SPD(s) 40 available to the VPN client for installing/updating VPN polic(ies) (see FIG. 8), as well as the SPD settings for the SPD(s) included in the list. In this regard, as will be appreciated, in various instances, a desired SPD is not included in the list, or a list of one or more SPDs has not yet been established, such as when the terminal user has yet to define any SPDs within the VPN client. In such instances, the terminal user can add one or more SPDs to the list of SPDs, which may or may not currently include any SPDs. For example, the terminal user can select to define SPD(s) from the "VPN Policy Servers" display by selecting an "New" command, as shown in FIG. 8. In instances in which the list of SPDs does not currently include any SPDs, however, the VPN client can present a confirmation dialog including the following statement and request: "No VPN policy servers defined. Define now?," as shown in the exemplar VPN client display of FIG. 14.

If the terminal user elects to forgo adding SPD(s) 40 in response to such a request, the VPN client 72 typically does not initiate adding SPD(s), and can again present the "VPN Policy Servers" display indicating that no SPDs are defined. At any point thereafter, the terminal user can select to add SPD(s) from the "VPN Policy Servers" display, such as by selecting the "New" command. To add an SPD to the list of SPD(s), then, the VPN client can thereafter receive, from the terminal user, a host name for the respective SPD, as well as an IAP, such as from a list of available IAPs. In addition, for the new SPD, the VPN client can receive an address (e.g., IP address) of the SPD. For an illustration of an exemplar VPN client display for receiving such information, see FIG. 15. After adding an SPD, if so desired, the VPN client can initiate synchronizing the VPN polic(ies) of the added VPN client, such as in the manner described above.

Also during management of the SPD(s) 40, the VPN client 72 can be capable of presenting a list of the available SPD(s) to the terminal user, as indicated above (see FIG. 8). From this list, then, the terminal user can elect to view detailed information regarding the SPD(s), as well as delete, edit or update one or more of the SPD(s). Additionally, for example, the terminal user can elect to synchronize the VPN polic(ies) of one or more of the SPD(s).

Again referring to FIG. 4, irrespective of how the VPN client 72 installs VPN polic(ies), or manages VPN polic(ies), or available SPD(s), after installing one or more VPN polic(ies), the VPN client can define, or receive a definition of, one or more VPN access points, as shown in block 81. As indicated above, each VPN access point can include a name or other identifier, an associated VPN policy and an associated IAP. For example, to define a VPN access point, the VPN client can receive, from the terminal user, a name for the respective VPN access point, as well as an associated IAP. Although the associated IAP can be selected from a list of available IAPs, in one typical embodiment, the associated IAP is predefined based upon the VPN GTW 36 that the VPN client desires to connect to establish and maintain a respective VPN access point connection, such as by a system administrator of the respective VPN GTW. In addition to the name and associated IAP, the VPN client can receive a selection of a VPN policy to associate with the VPN access point, such as from a list of installed VPN policies. As will be appreciated, in instances where the associated IAP is predefined based upon the VPN GTW, the associated VPN policy typically comprises a VPN policy of a SPD 40 serviced by the respective VPN GTW.

Figure 16:
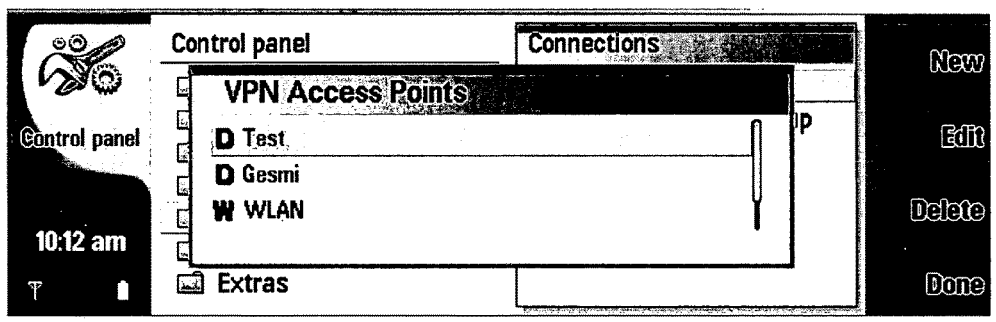
Figure 17:
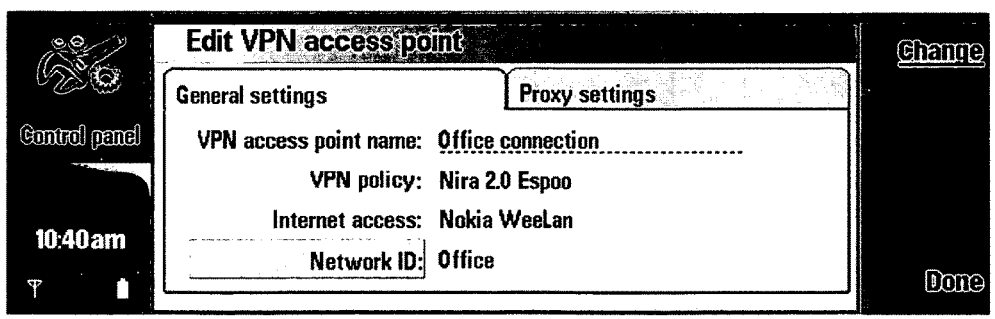

More particularly, in accordance with one embodiment of the present invention, each VPN access point can be defined by opening a "VPN Access Points" page or display of the VPN client 72, which may include a list of one or more previously defined VPN access points, as shown in the exemplar VPN client display of FIG. 16. Thereafter, the terminal user can select to define one or more VPN access points from the "VPN Access Points" display, such as by selecting a "New" command, as also shown in the exemplar VPN client display of FIG. 16. Thereafter, the VPN client can present a dialog including a number of input fields for receiving settings of the respective VPN access point, including a name or other identifier of the VPN access point, an associated VPN policy and an associated IAP. For example, as shown in the exemplar VPN client display of FIG. 17, the VPN client can present an "Edit VPN Access Point" page or display that includes fields for receiving terminal user input. As shown, in addition to the aforementioned VPN access point settings, the VPN access point can also include an associated network ID capable of identifying a VPN access point connection made with the respective VPN access point.

Irrespective of how the VPN access point(s) are defined, after defining one or more VPN access point(s), the VPN client 72 can activate one or more of the defined VPN access point(s). The VPN client can activate VPN access point(s) in any of a number of different manners. Likewise, the VPN client can directly activate a VPN access point. In one typical embodiment, however, before activating VPN access point(s), the VPN client can associate, or the terminal user can direct the VPN client to associate, one or more of the VPN access points with one or more applications 71 capable of operating on the terminal 10 such that the associated application(s) can thereafter activate the respective VPN access point(s), as shown in block 83. For example, the terminal user can direct the VPN client to associate a VPN access point with an E-mail application configured to send E-mail messages to and/or retrieve E-mail messages from an E-mail server (i.e., origin server 22) coupled to an Intranet 34 across a VPN GTW 36 from the terminal.

As will be appreciated, in lieu of associating a VPN access point with an application 71, one or more applications can be configured to request, and thereafter receive from the terminal user, selection of an access point, whether an IAP or a VPN access point. In such instances, during operation of an application, the terminal user can be presented with a list of configured access points, including IAP(s) and/or VPN access point(s). From the list, then, the terminal user can select an access point, such as a VPN access point, to thereby activate the respective access point. In this regard, the VPN client can be capable of associating VPN access point(s) with application(s), or receiving a selection of one or more VPN access point(s) during operation of application (s), much in the same manner as IAPs are conventionally associated with such applications. For purposes of illustration, the following description presumes that a VPN access point is associated with an application, although the VPN access point can equally be selected from a list of access points during operation of the application, as indicated above. After associating the VPN access point(s) with application(s), the VPN client 72 can be capable of activating VPN access point(s) based upon the associated VPN policy and IAP, as shown in block 85, to thereby access respective VPN(s). By accessing the VPN(s), then, the associated application(s) can be capable of establishing data connection (s) across the respective VPN(s), as shown in block 87.

Reference is now made to FIGS. 18A-18E, which more particularly illustrate various steps in a method of activating, as well as deactivating, a VPN access point in accordance with one embodiment of the present invention. As described herein, the VPN access point is associated with an E-mail application. It should be understood, however, that the VPN access point can be associated with any of a number of different applications, or need not be associated with any application. As shown in block 116 of FIG. 18A, a method of activating a VPN access point includes executing and operating an associated E-mail application. Thereafter, as shown in block 118, the E-mail application can be operated to request a data connection via the VPN access point, such as in response to a terminal user request to retrieve E-mail messages from the E-mail server associated with the E-mail application. Thereafter, if the E-mail application requires its own authentication, the E-mail application can be capable of authenticating the terminal user. For example, the E-mail application can be capable of authenticating the terminal user by requesting, and thereafter receiving from the terminal user or application settings, an E-mail account username/ password combination, as shown in blocks 120 and 122.

After authenticating the terminal user, if so required, the E-mail application (e.g., application 71) can attempt to connect to the associated E-mail server (i.e., origin server 22) via the associated VPN access point. During connection attempts to VPN access points, including the connection attempt by the E-mail application, the VPN client 72 can activate the VPN policy associated with the VPN access point associated with the E-mail application, as shown in block 124. As illustrated in blocks 126 and 128, in activating the VPN policy, if the VPN access point is incomplete, such as if the VPN access point does not include an associated IAP or VPN policy, the E-mail application can be prevented from connecting to the associated E-mail server. In such instances, the E-mail application can return to the state before attempting the connection request. Also, in instances in which the associated VPN access point does not include an associated IAP, the VPN client can notify the terminal user of the connection failure, such as by displaying the following: "Internet access point referred in the VPN access point is missing. Try reconfiguring the VPN access point." On the other hand, when the associated VPN access point does not include an associated VPN policy, the VPN client can again notify the terminal user of the connection failure, such as by displaying the following: "VPN policy referred in the VPN access point is missing. Try reconfiguring the VPN access point."

Also in activating the VPN policy, if the VPN policy comprises a user-specific or generic certificate policy, and the VPN policy does not include a certificate or if the certificate is invalid or not yet valid, the E-mail application (e.g., application 71) can likewise be prevented from connecting to the associated E-mail server, as shown in blocks 130 and 132. In such instances, the E-mail application can return to the state before attempting the connection request. In turn, the VPN client 72 can notify the terminal user of the connection failure, such as by displaying: "VPN connection activation failed. VPN policy must be updated," or "VPN connection activation failed. See VPN log for details."

If the VPN access point is complete and the VPN policy includes a valid certificate (for user-specific or generic certificate policies), the terminal 10, or more particularly the VPN client 72, can establish a connection to the IAP associated with the VPN access point associated with the E-mail application. As will be appreciated, in various instances, the IAP may require the terminal, or terminal user, to authenticate itself to the IAP before permitting such a connection. Thus, when the IAP requires authentication, the IAP, or more particularly the E-mail application (e.g., application 71) may prompt the terminal for authentication, such as for a username/password, as shown in blocks 134 and 136. Then, after the IAP has authenticated the terminal 10 or terminal user, or after activating the associated VPN policy when the IAP does not require authentication, the terminal can connect to the IAP, as shown in block 138. The terminal can connect to the IAP in any of a number of different manners based upon settings for the respective IAP stored by the terminal, as such is well known to those skilled in the art.

After the terminal has connected to the IAP, the VPN client 72 can access a respective VPN by establishing a secure tunnel to the VPN GTW 36 supporting the E-mail server (i.e., origin server 22) associated with the E-mail application, the VPN GTW also supporting the SPD 40 that provided the associated VPN policy (whether a user-specific or generic certificate policy or a generic non-certificate policy). Before establishing a tunnel with the respective VPN GTW, however, the terminal 10 or terminal user, or more particularly the VPN client 72, may be required to authenticate itself to the VPN GTW, as shown in block 140. In this regard, when the VPN policy comprises a user-specific or generic certificate policy, the VPN client can authenticate itself to the VPN GTW using one or more of the certificate(s) and private key/certificate pair(s) of the respective VPN policy. As indicated above, however, such certificate(s) and private key/certificate pair(s) can be stored in a password-protected key store. Thus, in such instances, the VPN client can request, and thereafter receive from the terminal user, the key store password to thereby access the key store. Upon receiving the key store password, then, the VPN client can retrieve one or more of the certificate(s) and private key/certificate pair(s) required for VPN authentication, and thereafter authenticate itself to the VPN GTW using the retrieved certificate(s) and private key/certificate pair(s).

In contrast to user-specific and generic certificate policies, when the VPN policy comprises a generic non-certificate policy, the VPN client 72 can authenticate itself to the VPN GTW 36 in accordance with username-password-type VPN authentication. In such instances, the VPN client can request, and receive from the terminal user, a username and password or passcode. The username and password/passcode can be received by the terminal user in any of a number of different manners, such as from a system administrator of the Intranet 34 including the E-mail server (i.e., origin server 22) being accessed by the E-mail application.

Irrespective of how the VPN client 72 authenticates itself to the VPN GTW 36, following the authentication procedure, the VPN client can establish a secure tunnel to the VPN GTW over the IAP with which the VPN client previously established a connection, as shown in block 142. The VPN client can establish the secure tunnel in accordance with any of a number of different techniques. In one embodiment, for example, the VPN client establishes the secure tunnel with the VPN GTW in accordance with IPSec. Then, after establishing the secure tunnel with the VPN GTW, the E-mail application can be capable of establishing a data connection with the associated E-mail application (i.e., origin server 22) across the secure tunnel to the VPN GTW, as shown in block 144. For example, the E-mail application can be capable of establishing a data connection with the associated E-mail application to retrieve E-mail messages from the E-mail server, such as in response to a terminal user request for the same.

After the E-mail application (e.g., application 71) has concluded communication with the associated E-mail server (i.e., origin server 22), the VPN client 72 can terminate access to the VPN to thereby permit the E-mail application to terminate the data connection with the E-mail server, as shown in block 89 of FIG. 4. The VPN client can terminate access to the VPN in any of a number of different manners. As shown more particularly in FIGS. 18B and 18C, for example, the VPN client can terminate access to the VPN by closing or otherwise terminating the secure tunnel between the VPN client and the VPN GTW 36, as shown in blocks 146 and 148. Thereafter, the VPN client can unload the previously activated VPN policy, as illustrated in block 150. Then, provided the terminal 10 does not have another actively maintained connection to the respective IAP, such as to actively maintain another VPN, the VPN client can be capable of terminating the connection between the terminal and the respective IAP, as shown in blocks 152 and 154. Otherwise, as shown in block 156, the VPN client can permit the connection to the IAP to remain active, although deactivating the VPN policy effectively terminated access to the VPN.

Figure 18A:
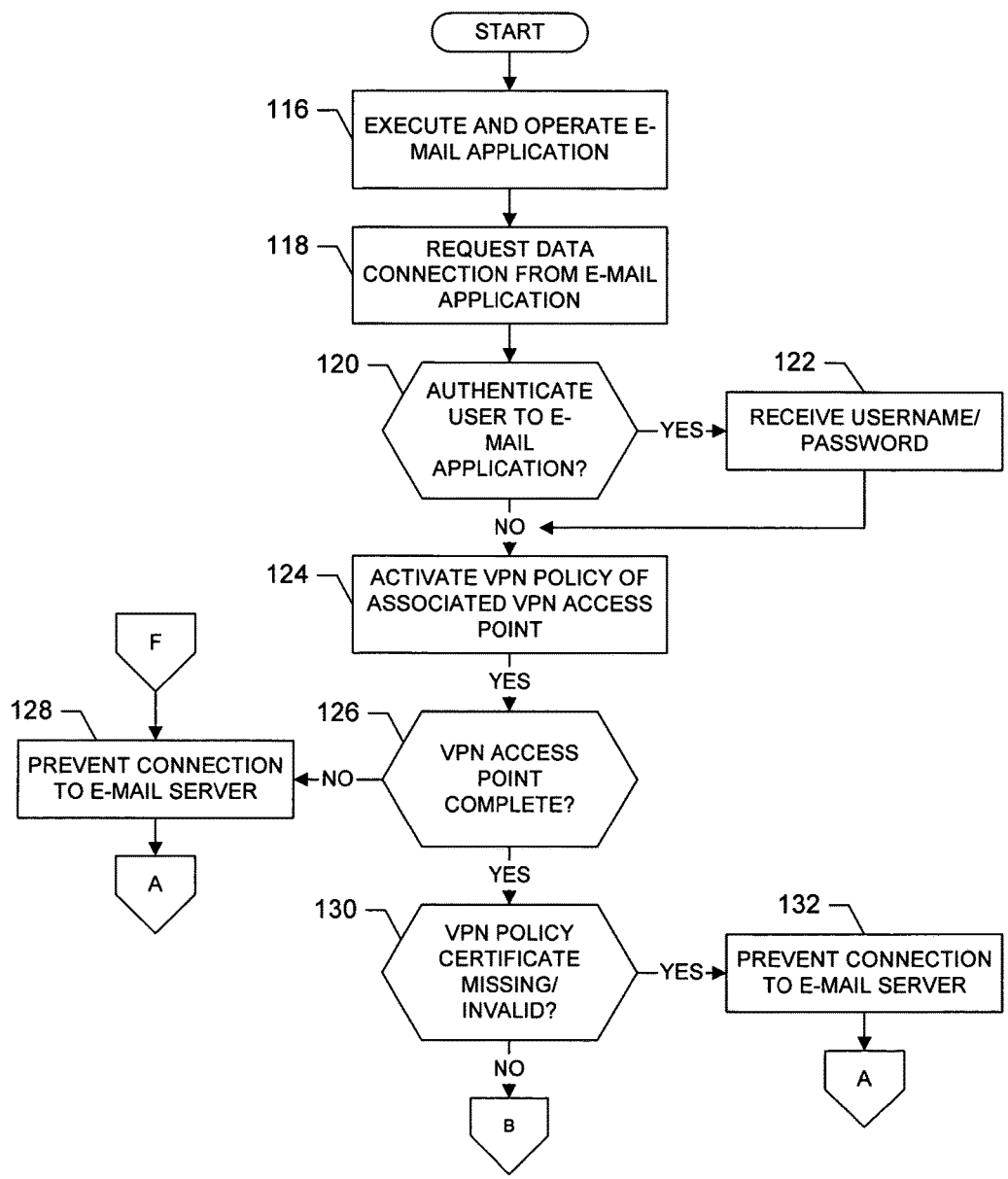
Figure 18B:
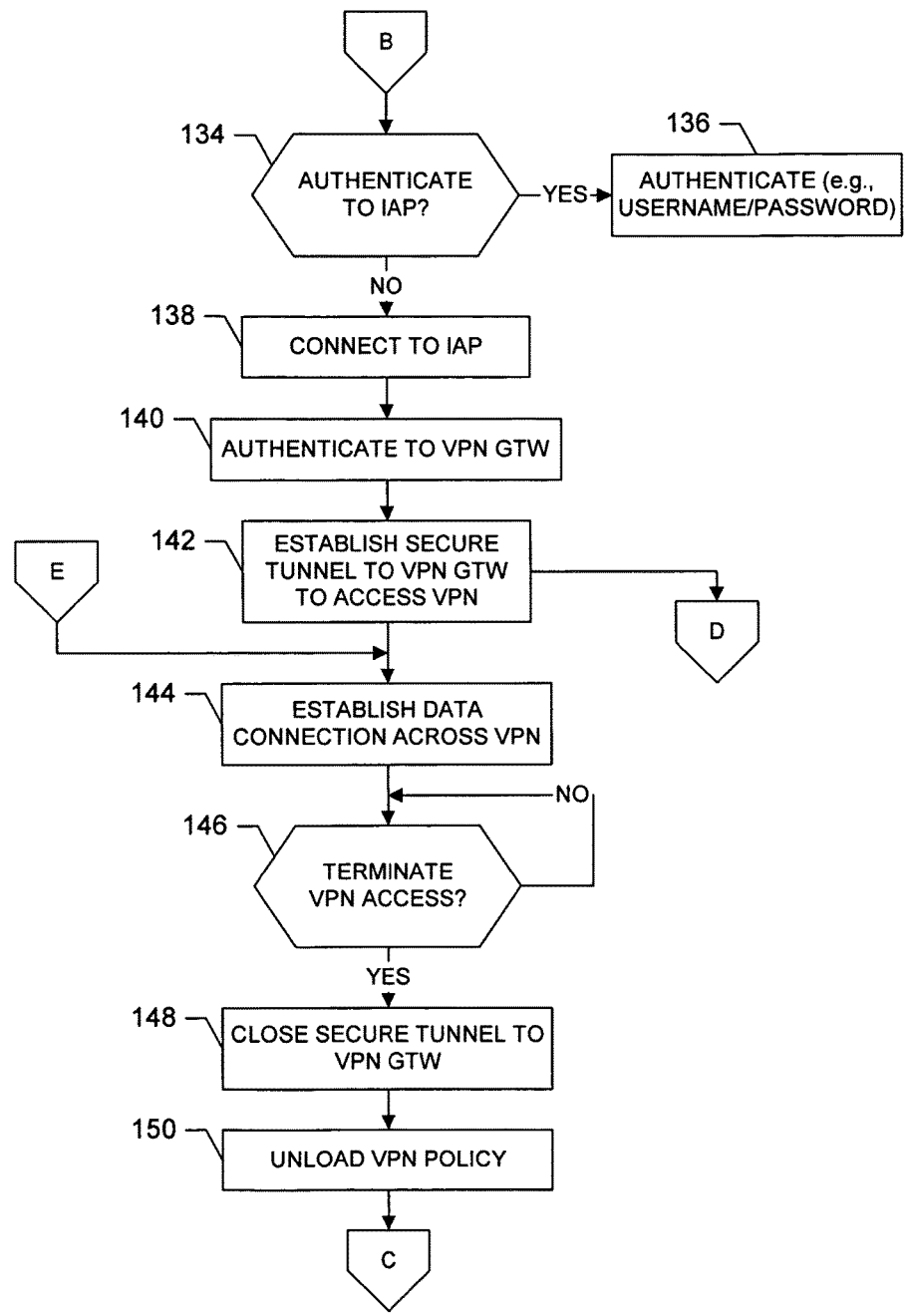
Figure 18C:
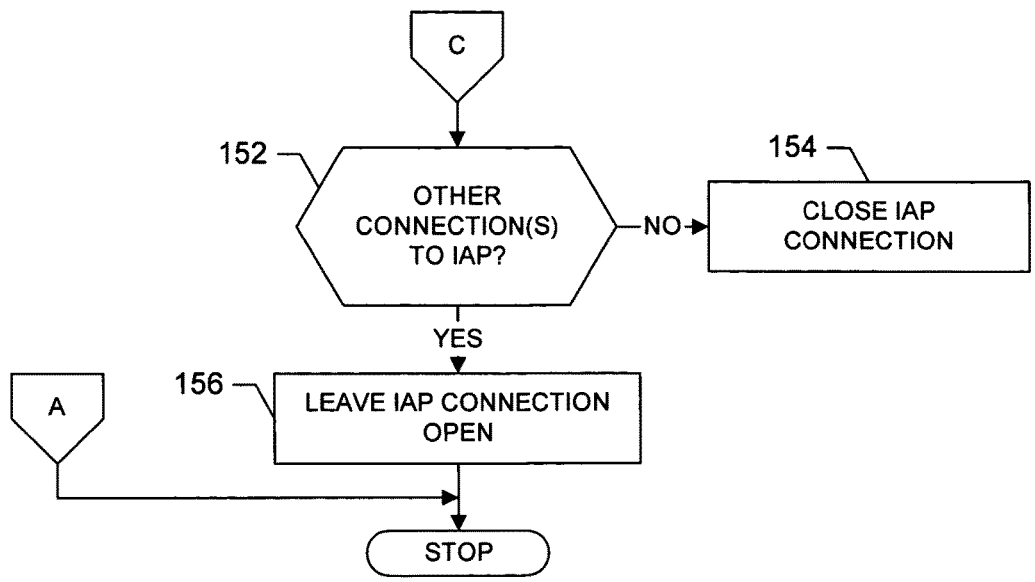
Figure 18D:
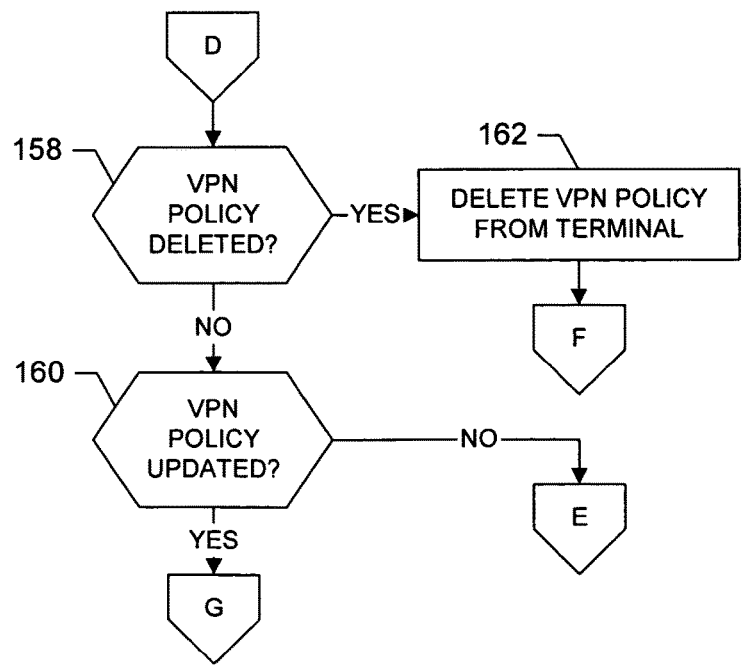
Figure 18E:
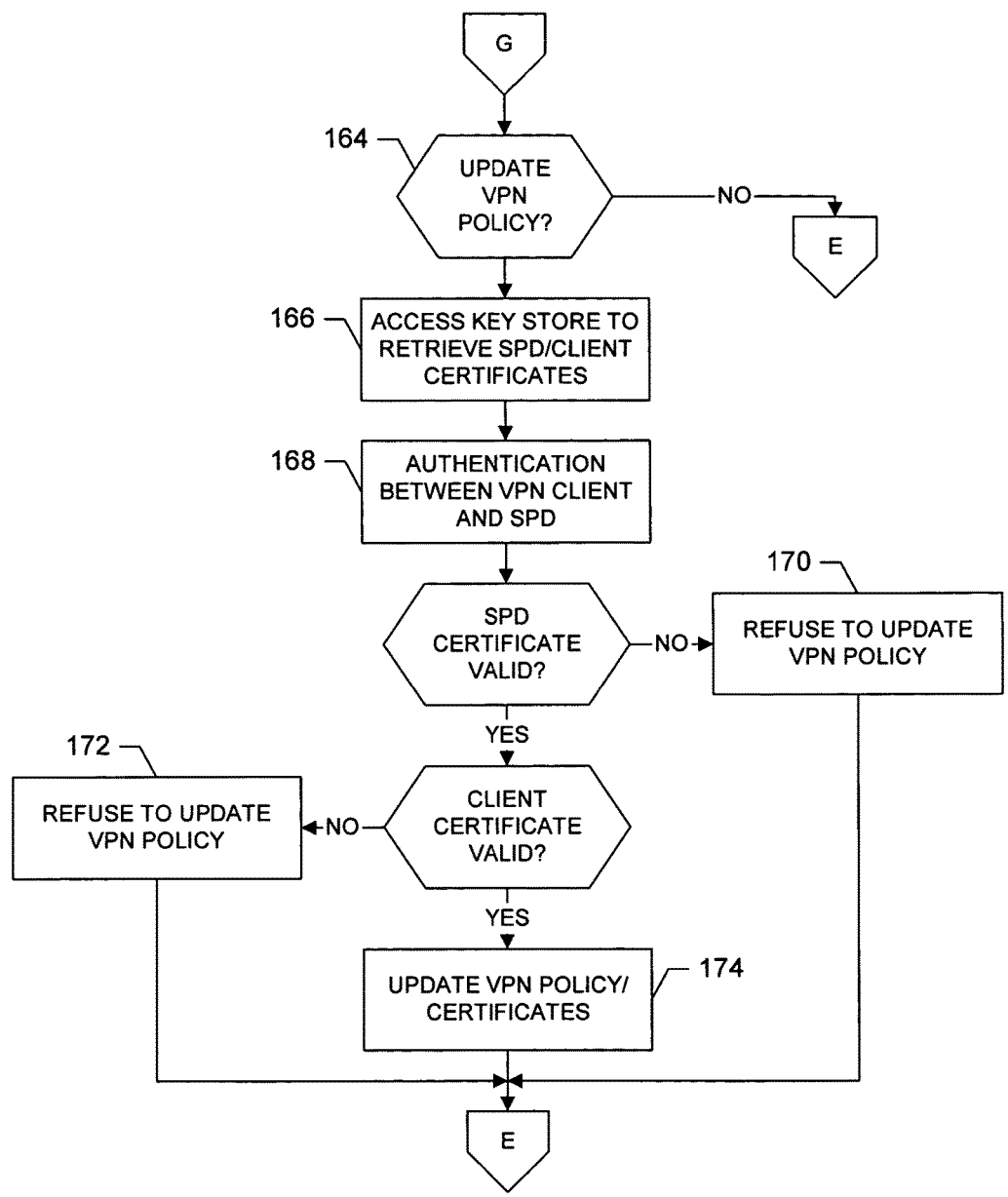

As will be appreciated, in various instances, the VPN policy associated with the activated VPN access point, may have changed between the previous update of the VPN policy and activating the respective VPN access point. Thus, in accordance with embodiments of the present invention, the VPN client 72 can be configured to automatically update the VPN policy associated with the activated VPN access point as the VPN client establishes the secure tunnel with the VPN GTW 36 (see block 142 of FIG. 18B), or after authentication of the VPN client if the VPN client did not successfully authenticate to the VPN client to thereby establish the secure tunnel. Referring now to FIGS. 18B, 18D and 18E, in one embodiment of the present invention, after establishing the secure tunnel with the VPN GTW, the VPN client can connect to the SPD 40 associated with the activated VPN policy, and serviced by the respective VPN GTW, to determine if the VPN policy has been updated or deleted from the SPD, as shown in blocks 158 and 160 of FIG. 18D.

If the VPN policy has not been updated or deleted from the SPD 40, the VPN client 72 can continue to operate in a manner such as that described above. If the VPN policy has been deleted, however, the VPN client 72 can delete the respective VPN policy from memory (e.g., non-volatile memory 70) of the terminal 10, as shown in block 162. In such instances, after deleting the VPN policy from memory, the VPN access point becomes incomplete. As before then, the E-mail application can be prevented from connecting to the associated E-mail server (see block 128). In such instances, the E-mail application can return to the state before attempting the connection request. If so desired, the VPN client can also notify the terminal user of the policy deletion, such as by presenting, to the terminal user, the following: "VPN policy in use has been deleted. Try reconfiguring the VPN access point."

If the VPN policy has been updated, on the other hand, the VPN client 72 can request, from the terminal user, an indication whether to update the VPN policy, as shown in block 164 of FIG. 18E. If the terminal user elects to refrain from updating the VPN policy, the VPN client can operate in a manner as though the VPN policy had not been updated. If the terminal user elects to update the VPN policy, however, the VPN client can update the VPN policy. Before updating the VPN policy from the SPD 40, the VPN client may authenticate the SPD and/or authenticate itself to the SPD, such as based upon a certificate authentication technique using the SPD certificate and/or user certificate stored in the password-protected key store. In such instances, the VPN client can request, and thereafter receive from the terminal user, the key store password to thereby access the key store and retrieve the SPD certificate and/or client certificate, as shown in block 166.

After retrieving the SPD certificate and/or client certificate, the VPN client 72 can authenticate the SPD and/or authenticate itself to the SPD based upon the respective certificates, as shown in block 168. In this regard, if the SPD certificate has expired, been revoked or is otherwise invalid, the SPD 40 can refuse to update the VPN policy with the VPN client, as shown in block 170. Likewise, if the client certificate has expired, been revoked or is otherwise invalid, the VPN client, or more particularly the SPD, can refuse to update the VPN policy, as shown in block 172. In such instances, if so desired, the VPN client can notify the terminal user of the authentication failure, such as by presenting, to the terminal user, information dialog (e.g., "Policy server logon failed. See VPN log for details."). The VPN client can thereafter operate in a manner as though the VPN policy had not been updated.

If the SPD certificate and client certificate are both valid, and authentication between the VPN client 72 and SPD 40 is successful, the VPN client can update the VPN policy from the SPD. More particularly, the VPN client can download, from the SPD, the updated VPN policy and associated certificates (for user-specific or generic certificate policies) stored, generated or otherwise received by the SPD, as shown in block 174. Upon completing the policy download, or synchronization, the VPN client can notify the terminal user that the policy updating has been completed, if so desired. The VPN client can then operate, as before, by completing establishment of the secure tunnel (see block 142).

As indicated above, one or more IAPs and SPDs 40 are capable of being selected from a list of available IAPs, and one or more VPN access points are capable of being defined, within the VPN client 72. It should be understood, however, that in various instances, it may be desirable to utilize one or more IAPs, SPDs, VPN access points or the like that are not otherwise included in lists within the VPN client, or defined within the VPN client. In such instances, the terminal 10, or more particularly the VPN client, can be capable of receiving one or more IAPs (or IAP settings), SPDs (or SPD settings defining SPD(s)) and/or VPN access points. The VPN client can receive one or more such data structures in any of a number of different manners. In one embodiment, for example, the VPN client is capable of receiving one or more such data structures in accordance with a SMS technique.

According to one aspect of the present invention, all or a portion of the system of the present invention, such as all or portions of the terminal 10, generally operates under control of a computer program product (e.g., VPN client 72). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 4, 5A-5C, and 18A-18E are flowcharts of methods, systems and/or computer program products according to embodiments of the present the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts block(s) or step(s).

Accordingly, blocks or steps of the flowcharts supports combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus of a Virtual Private Network (VPN) client comprising:
    a processor; and
    a memory including computer program code, the memory and the computer program code being configured to, with the processor, cause the apparatus to at least:
       prior to establishing and maintaining VPN access point connection, install or update one or more VPN policies by receiving a selection of a Security Policy Database (SPD) from which to install or update the one or more VPN policies, identifying an internet access point via which the SPD is accessible, establishing a data connection to the internet access point to thereby establish a data connection to the SPD via which to receive the one or more VPN policies, and installing or storing the one or more VPN policies;
       after installing or updating the one or more VPN policies, define one or more VPN access points, wherein each VPN access point comprises an internet access point via which the VPN client is capable of accessing a VPN gateway,
          wherein each VPN access point also comprises a VPN policy, wherein the VPN policy is selected from at least one VPN policy installed on the apparatus, wherein the VPN policy specifies at least one security policy defining security for traffic across the VPN gateway, and
          wherein a VPN is a logical network located within one or more physical networks, wherein the internet access point of each VPN access point comprises a physical access point distinct from the apparatus, wherein each physical access point is configured to provide the apparatus with access to the one or more physical networks within which the VPN is located; and after defining the one or more VPN access points, activate one or more of the VPN access points in order to access the VPN using the one or more VPN access points that have been activated, wherein accessing the VPN establishes a connection to the internet access point associated with a respective one of the one or more VPN access points that have been selected in order to establish a secure tunnel.

2. An apparatus according to claim 1, wherein activating one or more VPN access points includes:

associating a respective VPN access point with the at least one application; and activating the respective VPN access point from the at least one application causing at least one data connection to be established from the at least one application across the VPN.

3. An apparatus according to claim 1, wherein activating the one or more VPN access points includes:

establishing the secure tunnel over the internet access point associated with the one or more VPN access points that have been activated based upon the VPN policy associated with the one or more VPN access points that have been activated.

4. An apparatus according to claim 3, wherein the memory and computer program code are further configured to, with the processor, cause the apparatus to further:

terminate access to the VPN by:
  closing of the secure tunnel;
  unloading of the VPN policy associated with the one or more VPN access points that have been activated; and
  terminating the connection with the internet access point associated with the one or more VPN access points that have been activated.

5. An apparatus according to claim 1, further comprising: receiving a name of at least one VPN access point.

6. An apparatus according to claim 1, wherein the apparatus installing or updating the one or more VPN policies includes installing the at least one VPN policy by the VPN client, and wherein installing or updating the one or more VPN policies comprises downloading the one or more VPN policies by:

establishing a data connection from the VPN client to the internet access point associated with the SPD;

establishing a data connection from the VPN client to the SPD via the data connection established with the internet access point;

authenticating at least one of the SPD and the VPN client; and downloading the one or more VPN policies from the SPD when at least one of the SPD and the VPN client is authenticated.

7. An apparatus according to claim 1, wherein establishing the connection to the internet access point associated with the respective one of the one or more VPN access points that have been selected includes recalling and interpreting a definition for the respective VPN access point stored or installed on the apparatus.

8. A method implemented by a Virtual Private Network (VPN) client, the method comprising:

prior to establishing and maintaining a VPN access point connection, installing or updating one or more VPN policies by receiving a selection of a Security Policy Database (SPD) from which to install or update the one or more VPN policies, identifying an internet access point via which the SPD is accessible, establishing a data connection to the internet access point to thereby establish a data connection to the SPD via which to receive the one or more VPN policies, and installing or storing the one or more VPN policies, after installing or updating the one or more VPN policies, define one or more VPN access points, wherein each VPN access point comprises an internet access point via which the VPN client is capable of accessing a VPN gateway, wherein each VPN access point also comprises a VPN policy, wherein the VPN policy is selected from at least one VPN policy installed on an apparatus, wherein the VPN policy specifies at least one security policy defining security for traffic across the VPN gateway, and wherein a VPN is a logical network located within one or more physical networks, wherein the internet access point of each VPN access point comprises a physical access point distinct from the apparatus, wherein each physical access point is configured to provide the apparatus with access to the one or more physical networks within which the VPN is located; and after defining the one or more VPN access points, activate one or more of the VPN access points in order to access the VPN using the one or more VPN access points that have been activated, wherein accessing the VPN establishes a connection to the internet access point associated with a respective one of the one or more VPN access points that have been selected in order to establish a secure tunnel.

9. A method according to claim 8, wherein activating one or more VPN access points comprises:

associating a respective VPN access point with the at least one application; and activating the respective VPN access point from the at least one application to establish the at least one data connection from the at least one application across the VPN.

10. A method according to claim 8, wherein activating the one or more VPN access points comprises:

establishing the secure tunnel over the internet access point associated with the one or more VPN access points that have been activated based upon the VPN policy associated with the one or more VPN access points that have been activated.

11. A method according to claim 10 further comprising:

terminating access to the VPN comprises:
  closing the secure tunnel;
  unloading the VPN policy associated with the one or more VPN access points that have been activated; and
  terminating the connection with the internet access point associated with the one or more VPN access points that have been activated.

12. A method according to claim 8, further comprising: receiving a name of at least one VPN access point.

13. A method according to claim 8, wherein installing or updating the one or more VPN policies comprises installing at least one VPN policy by the VPN client, and wherein installing or updating the one or more VPN policies comprises downloading the one or more VPN policies comprises:

establishing a data connection from the VPN client to the internet access point associated with the SPD;

establishing a data connection from the VPN client to the SPD via the data connection established to the internet access point;

authenticating at least one of the SPD and the VPN client; and downloading the one or more VPN policies from the SPD when at least one of the SPD and the VPN client is authenticated.

14. A method according to claim 8, wherein establishing the connection to the internet access point associated with the respective one of the one or more VPN access points that have been selected includes recalling and interpreting a definition for the respective VPN access point stored or installed on the apparatus.

15. A computer program product comprising a non-transitory computer-readable storage medium having computer-readable program code portions stored therein, the computer-readable storage medium and computer-readable program code portions being configured to, with a processor, cause an apparatus of a Virtual Private Network (VPN) client to at least:

prior to establishing and maintaining a VPN access point connection, install or update one or more VPN policies by receiving a selection of a Security Policy Database (SPD) from which to install or update the one or more VPN policies, identifying an internet access point via which the SPD is accessible, establishing a data connection to the internet access point to thereby establish a data connection to the SPD via which to receive the one or more VPN policies, and installing or storing the one or more VPN policies, after installing or updating the one or more VPN policies, define one or more VPN access points, wherein each VPN access point comprises an internet access point via which the VPN client is capable of accessing a VPN gateway, wherein each VPN access point also comprises a VPN policy, wherein the VPN policy is selected from at least one VPN policy installed on an apparatus, wherein the VPN policy specifies at least one security policy defining security for traffic across the VPN gateway, and wherein a VPN is a logical network located within one or more physical networks, wherein the internet access point of each VPN access point comprises a physical access point distinct from the apparatus, wherein each physical access point is configured to provide the apparatus with access to the one or more physical networks within which the VPN is located; and after defining the one or more VPN access points, activate one or more of the VPN access points in order to access the VPN using the one or more VPN access points that have been activated, wherein accessing the VPN establishes a connection to the internet access point associated with a respective one of the one or more VPN access points that have been selected in order to establish a secure tunnel.

16. A computer program product according to claim 15, wherein activating one or more VPN access points includes:

associating a respective VPN access point with the at least one application; and activating the respective VPN access point from the at least one application causing the at least one data connection to be established from the at least one application across the VPN.

17. A computer program product according to claim 15, wherein activating the one or more VPN access points includes:

establishing the secure tunnel over the internet access point associated with the one or more VPN access points that have been activated based upon the VPN policy associated with the one or more VPN access points that have been activated.

18. A computer program product according to claim 17, wherein the computer-readable storage medium and computer-readable program code portions are further configured to, with the processor, cause the apparatus to further:

terminate access to the VPN by:
closing of the secure tunnel;
unloading of the VPN policy associated with the one or more VPN access points that have been activated; and
terminating the connection with the internet access point associated with the one or more VPN access points that have been activated.

19. A computer program product according to claim 15, wherein the computer-readable storage medium and computer-readable program code portions are further configured to, with the processor, cause the apparatus to further:

receiving a name of at least one VPN access point.

20. A computer program product according to claim 15, wherein the apparatus installing or updating the one or more VPN policies includes installing at least one VPN policy by the VPN client, and wherein the apparatus installing or updating the one or more VPN policies comprises downloading the one or more VPN policies by:

establishing a data connection from the VPN client to the internet access point associated with the SPD;

establishing a data connection from the VPN client to the SPD via the data connection established with the internet access point;

authenticating at least one of the SPD and the VPN client; and downloading the one or more VPN policies from the SPD when at least one of the SPD and the VPN client is authenticated.

21. A computer program product according to claim 15, wherein establishing the connection to the internet access point associated with the respective one of the one or more VPN access points that have been selected includes recalling and interpreting a definition for the respective VPN access point stored or installed on the apparatus, and establishing a connection with the internet access point associated with the respective VPN access point to provide the apparatus with access to the one or more physical networks within which the VPN is located.

* * * * *